United States Patent [19]

Isshiki et al.

[11] Patent Number: 5,218,592
[45] Date of Patent: Jun. 8, 1993

[54] DISC PLAYER

[75] Inventors: Taizo Isshiki, Daito; Yukiyasu Tsuruta, Kadoma; Tsuneharu Tamatani, Daito; Masanao Yoshida, Yao; Hitoshi Ogata, Daito, all of Japan

[73] Assignee: Sanyo Electric Co., Ltd., Osaka, Japan

[21] Appl. No.: 400,214

[22] Filed: Aug. 29, 1989

[30] Foreign Application Priority Data

| Aug. 30, 1988 | [JP] | Japan | 63-215874 |
| Sep. 20, 1988 | [JP] | Japan | 63-235833 |
| Sep. 29, 1988 | [JP] | Japan | 63-245147 |

[51] Int. Cl.⁵ ............................................. G11B 33/02
[52] U.S. Cl. ................................ 369/75.2; 369/36; 369/77.1; 369/197
[58] Field of Search .............. 369/75.1, 75.2, 77.1, 369/77.2, 36–39, 197–198, 191, 194, 265

[56] References Cited

U.S. PATENT DOCUMENTS

| 4,337,533 | 6/1982 | Ando et al. | 369/265 X |
| 4,410,971 | 10/1983 | Eisemann | 369/265 X |
| 4,773,057 | 9/1988 | Otsuka et al. | 369/75.2 |
| 4,783,777 | 11/1988 | Camerik | 369/265 |
| 4,833,666 | 5/1989 | Gijzen et al. | 369/265 X |
| 4,855,990 | 8/1989 | Akiyama | 369/265 |

FOREIGN PATENT DOCUMENTS

| 0261384 | 3/1988 | European Pat. Off. |
| 57-195368 | 12/1982 | Japan |
| 60-80159 | 5/1985 | Japan |
| 61-145758 | 7/1986 | Japan |
| 62-62485 | 3/1987 | Japan |
| 63-129584 | 6/1988 | Japan |

Primary Examiner—William M. Shoop, Jr.
Assistant Examiner—David Martin
Attorney, Agent, or Firm—Nikaido, Marmelstein, Murray & Oram

[57] ABSTRACT

A disc player including a fixed chassis provided with a disc transport tray reciprocatingly movably, and a movable chassis liftably supported by the fixed chassis. The movable chassis has mounted thereon a disc rotating turntable and a signal reproduction pickup reciprocatingly movable along a radial line of a disc on the turntable. The tray and the movable chassis are driven by a loading motor serving as a common power source. First and second power transmission routes from the motor to the tray and movable chassis are changed over to each other by an intermediate gear mechanism provided between the tray and the movable chassis.

12 Claims, 25 Drawing Sheets

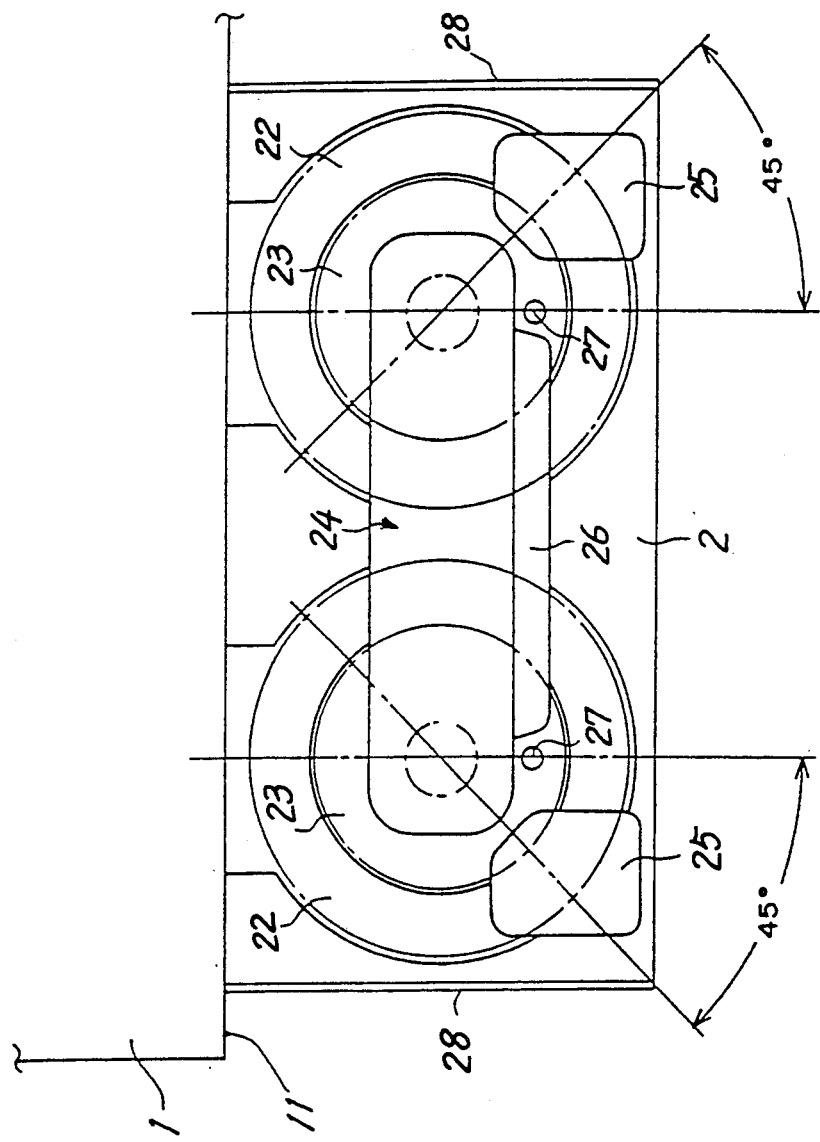

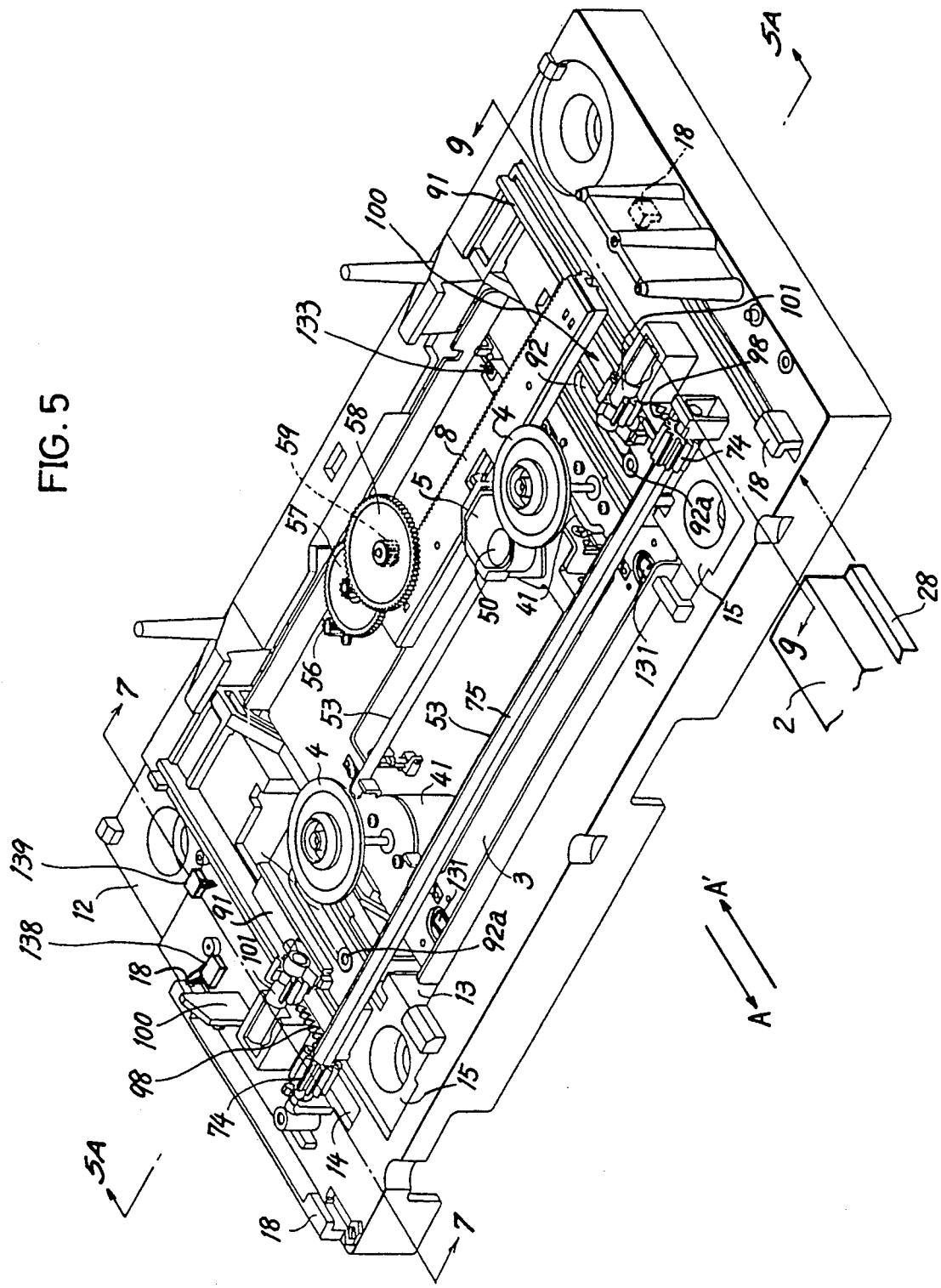

DISC PLAYER

FIELD OF THE INVENTION

The present invention relates to disc players for reproducing recorded signals, such as audio or video signals, from optical discs by an optical pickup, and more particularly to mechanisms and signal reproduction systems for use in disc players of the front loading type wherein the front panel of the player body is provided with a retractable tray having one or a plurality of disc support portions.

BACKGROUND OF THE INVENTION

For use in compact disc players for reproducing digital audio signals from compact discs wherein the signals are optically recorded, Examined Japanese Patent Publication SHO 60-80159, for example, discloses a loading device for transporting the disc to a signal reproducing position inside the player. The disclosed loading device comprises a tray having a disc support portion, retractably provided at the front panel of the player body and horizontally reciprocatingly movable by the power of a motor. The tray has a lifter for slightly lifting the disc during the transport thereof, while disc clamper is provided inside the player above a turntable for holding the disc in pressing contact with the turntable. After the disc supported on the tray by the lifter has been transported into the player, the disc clamper lowers with the retraction of the lifter into the tray, and the disc on the tray is lowered onto the turntable and held in pressing contact with the turntable.

The disc player described above requires, in addition to a mechanism for reciprocatingly driving the tray, a mechanism for driving the disc clamper upward and downward and a mechanism for operating the lifter. The player therefore has the problem of being large-sized and necessitates an increased number of parts.

On the other hand, Unexamined Japanese Patent Publication SHO 61-145758 discloses a disc player which comprises, as seen in FIG. 26, a subchassis 161 pivotally movably supported by a shaft 162 on a main chassis 160 and having mounted thereon a turntable 163, pickup 164, pickup transport mechanism 165, etc. A disc clamper 166 is mounted on the main chassis 160 rotatably but immovably upward or downward. When a tray 168 is pushed into the body of the player, the subchassis 161 is moved upward by the operation of a chassis drive mechanism 167. With this movement, the turntable 163 on the sub-chassis 161 lifts a disc off the tray 168 and presses the disc against the clamper 164, whereby the disc is completely loaded. Accordingly, the disc can be lifted and lowered and the turntable is caused to effect a clamping action by a mechanism which is merely adapted to pivotally move the subchassis.

However, the disc player is cumbersome to use since the tray 168 must be reciprocatingly moved manually. The tray may be made automatically movable by providing a known tray drive mechanism which is operable by a motor, whereas the motor, if additionally provided, makes the player larger and heavier and needs a motor control circuit, which makes the circuit of the player complex in construction.

With disc players, an optical pickup is moved along a radial line of the disc which is rotating at a hight speed for the pickup to trace tracks formed on the signal bearing surface thereof in the form of concentric circles or a spiral track thereon and thereby read signals. Unexamined Japanese Patent Publication SHO 62-62485, for example, discloses a mechanism for transporting the pickup.

The disclosed transport mechanism comprises a guide shaft for guiding the pickup for a linear motion thereof, a rack secured to the pickup immovably relative thereto, a pinion in mesh with the rack, and a feed motor for driving the pinion. The pickup is reciprocatingly movable by the operation of the feed motor.

With the above pickup transport mechanism, the pickup is mounted on the guide shaft without any backlash so as to be movable straight accurately, with the rack secured to the pickup immovably relative thereto, so that the pitch line of the rack must be parallel to the direction of movement of the pickup with high precision. If the parallelism is low, the distance between the rack and the pinion varies with the travel of the pickup, impairing the proper meshing engagement therebetween and giving rise to the problem that the power of the motor will not be transmitted to the pickup smoothly, for example, owing to objectionable meshing of the rack with the pinion.

With disc players adapted for a multiplicity of functions in recent years, disc players have been proposed wherein two discs can be loaded at the same time for a single pickup to read signals therefrom in a desired order (as disclosed, for example, in Unexamined Japanese Patent Publication SHO 57-195368). With this player, two discs are arranged side by side on a plane within the player, and the pickup is reciprocatingly transported along a path extending over the two discs.

In the case where the foregoing drive mechanism comprising a rack and a pinion is employed for transportion the pickup of such a disc player, the above-mentioned problem arising from the poor parallelism between the rack and the direction of pickup movement becomes more pronounced because the distance of movement of the pickup is more than twice the corresponding distance in conventional common disc players, necessitating a rack with more than twice the conventional length.

Although the disc player disclosed in the Publication SHO 57-195368 is adapted to reproduce signals successively from the two discs loaded therein, the player is not of the front loading type and therefore has the drawback that discs are not loadable conveniently.

SUMMARY OF THE INVENTION

An object of the present invention is to provide a disc player which comprises a tray reciprocatingly movable through a front panel inwardly and outwardly thereof, and a movable chassis mounted on a fixed chassis upwardly and downwardly movably and having a turntable, a pickup, etc. mounted thereon and in which the reciprocating movement of the tray and the upward-downward movement of the movable chassis can be effected continuously by a loading motor serving as a common power source therefor.

Another object of the present invention is to provide a disc player of the type stated above which has a first power transmission route from the loading motor to the tray, a second power transmission route from the loading motor to the movable chassis, and an intermediate gear mechanism adapted to change over the two routes to each other with the loading motor held in rotation in the same direction.

Another object of the present invention is to provide a disc player comprising a pickup supported on a chassis reciprocatingly movably and a pickup transport mechanism wherein a pinion drivingly rotatably by a feed motor is in mesh with a rack coupled to the pickup, the pickup tranport mechanism being adapted to smoothly transmit power from the feed motor to the pickup and to transport the pickup accurately on a straight line even if the parallelism between the direction of pickup movement and the pitch line of the rack is somewhat impaired.

Another object of the present invention is to provide a disc player of the front loading type which comprises a tray loadable with two discs at the same time, and a pickup transportable along a path over the two discs on the tray so as reproduce signals from the desired disc.

Still another object of the present invention is to provide disc player which is adapted for the playback of a plurality of discs in succession and in which a pickup is adapted to read contents data from the discs in an optimum order in the course of disc loading and thereafter wait for signal reproduction at the contents data recorded position of the disc to be driven first for playback so as to be operable for signal reproduction promptly.

The present invention provides a disc player which comprises a fixed chassis having a disc transport tray mounted thereon reciprocatingly movably along a path, and a movable chassis liftably supported by the fixed chassis, the movable chassis being provided with a disc rotating turntable and a signal reproduction pickup reciprocatingly movable along a radial line of the disc to be placed on the turntable.

The tray and the movable chassis are driven by means which comprises a drive gear drivingly rotatable by a loading motor, a tray drive mechanism having a rack meshable with the drive gear, a movable chassis drive mechanism having a rack portion meshable with the drive gear, and an intermediate gear mechanism for effecting a change-over between a first power transmission route wherein the tray drive mechanism is in operation and a second power transmission route wherein the chassis drive mechanism in operation. The intermediate gear mechanism receives power from one of the power transmission routes in operation to forcibly bring the other route into operation.

Accordingly, the reciprocating movement of the tray and the upward-downward movement of the movable chassis can be effected continuously by the loading motor serving as a common power source.

The chassis drive mechanism comprises a drive member slidably mounted on the fixed chassis, and a cam mechanism interposed between the drive member and the movable chassis. The rack portion is integral with the drive member. With the movement of the drive member in a tray withdrawal direction, the cam mechanism operates to drive the movable chassis upward.

Consequently, the drive gear, when moving the tray toward the disc loading side, rotates in the same direction as when lifting the movable chassis, with the result that a disc loading operation including tray transport through disc clamping can be effected with the loading motor held in rotation in the same direction.

The pickup is transported by a mechanism which comprises guide means for guiding straight movement of the pickup, rack means reciprocatingly movable in parallel to the direction of movement of the pickup, a pinion meshing with the toothed portion of the rack means at all times and drivingly rotatable by a feed motor, and connecting means for interconnecting the rack means and the pickup so that the rack means and the pickup are not movable relative to each other along the direction of pickup movement but are movable relative to each other in a direction perpendicular to the direction of pickup movement.

Accordingly, even if the parallelism between the direction of pickup movement and the rack means is somewhat impaired, variations in the distance between the pickup and the rack means are absorbed by the relative movement therebetween to ensure smooth and accurate transport of the pickup.

The present invention further provides a disc player which comprises a pair of turntables, a pickup reciprocatingly movable on a straight line through the centers of rotation of the turntables, and a reciprocatingly movable tray. The tray is formed on its upper side with a pair of recessed disc support portions arranged in a direction perpendicular to the direction of movement of the tray. The tray further has a cutout across both the disc support portions for the pair of turntables and the pickup to advance thereinto. When the tray is set in the disc loading end of path of its movement, two discs on the tray are positioned above the respective turntables. The discs are thereafter clamped on the turntables.

Accordingly, the pickup is reciprocatingly movable through the cutout in the tray to reproduce signals from both the discs.

The tray is marked on its front side with a pair of identification symbols in corresponding relation with the pair of disc support portions, respectively.

In the course of disc loading, the pickup moves toward the loading completed position of the disc corresponding to the identification symbol later in order than the other symbol.

On completion of disc loading, the pickup moves from this disc toward the other disc and reads the contents data on the discs during this movement.

Eventually, the pickup waits for signal reproduction at the contents data recorded position of the other disc corresponding to the other identification symbol earlier in order.

Accordingly, when a disc playback signal is subsequently given, the pickup can be promptly brought into operation for signal reproduction.

BRIEF DESCRIPTION OF THE DRAWINGS

FIG. 4 is a plan view of the tray;

FIG. 5 is a perspective view showing various mechanisms on a fixed chassis and a movable chassis, with the tray and a disc clamp mechanism removed;

DETAILED DESCRIPTION OF EMBODIMENT

The present invention will be described below with reference to the drawings showing an embodiment thereof, i.e., a disc player adapted for the playback of two compact discs in succession.

Overall Construction and Disc Loading Operation

Figure 1:
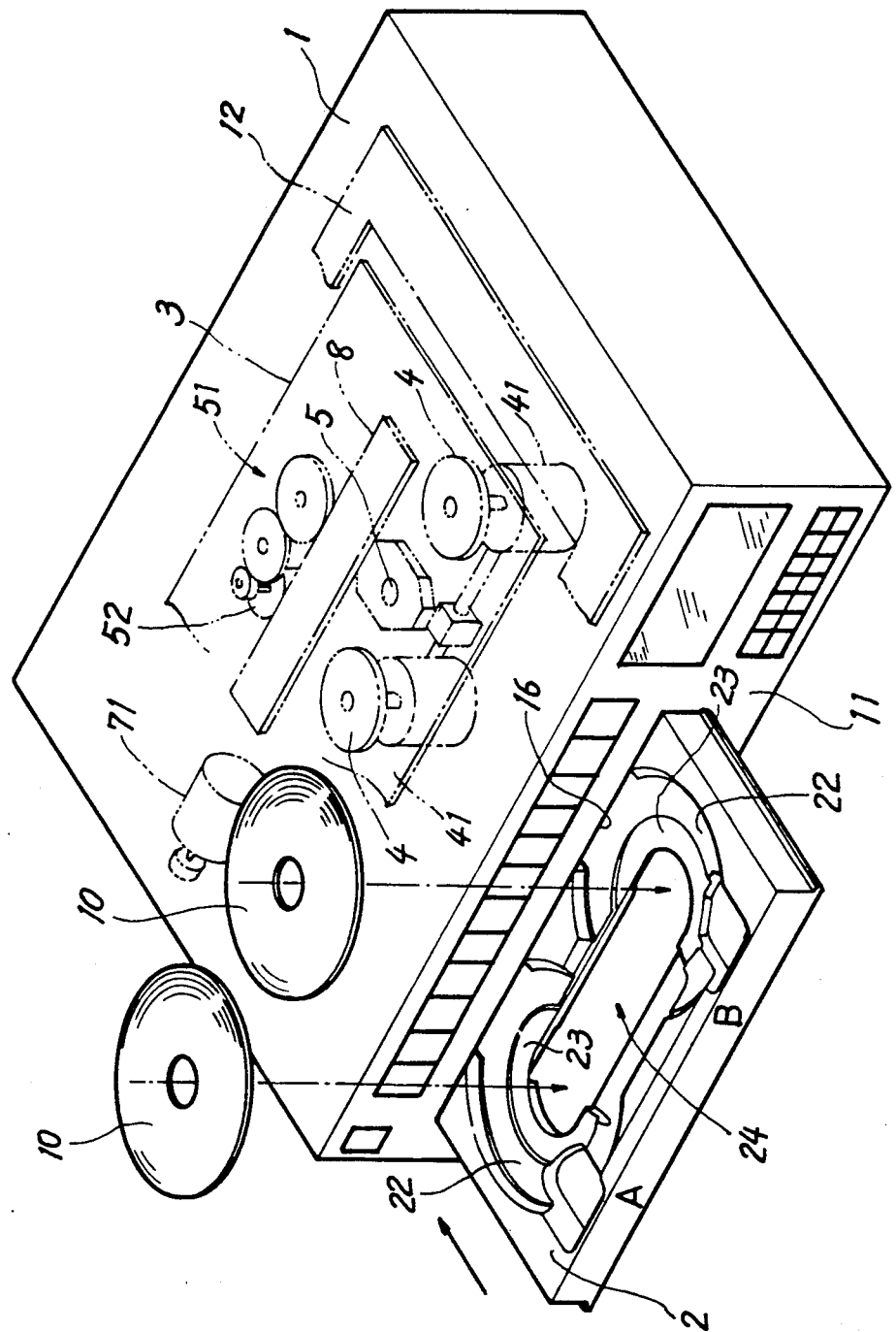
FIG. 1 is a perspective view showing the cabinet of a disc player embodying the invention, with its tray in a disc unloaded state.

As shown in FIG. 1, the disc player has a flat cabinet 1 having housed therein the mechanisms and electric circuit to be described later. A tray 2 having support portions for two compact discs 10 is movable into and out of an opening 16 of the cabinet provided with a front panel 11.

A fixed chassis 12 provided with a loading motor 71, etc. is attached to the cabinet 1 inside thereof. A movable chassis 3 is liftably supported on the fixed chassis 12 and has mounted thereon a pair of turntables 4, 4, pickup 5, pickup transport mechanism 51, etc.

The horizontal movement of the tray 2 and the upward-downward movement of the movable chassis 3 are effected, as will be described later, by the loading motor 71 which serves as a common power source therefor.

Figure 2A:
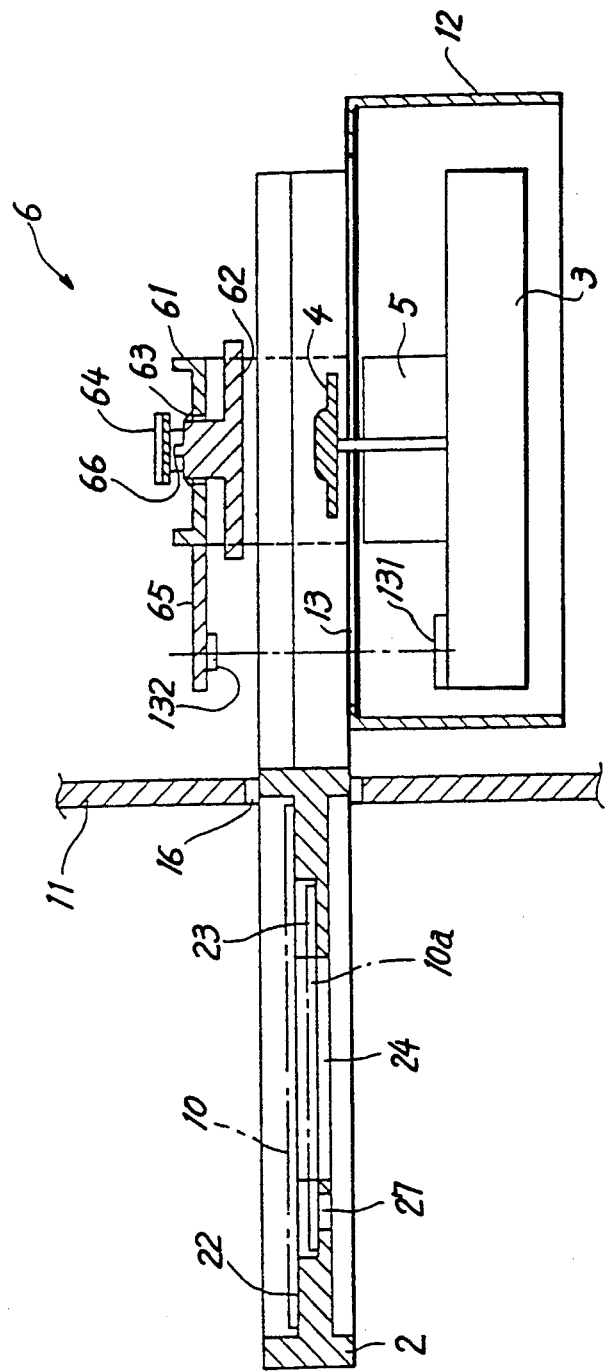
FIGS. 2A, 2B and 2C are schematic views in section showing a series of movements from the disc unloaded state to a disc loaded state.

With reference to FIG. 2A, a clamp member 62 is positioned above each turntable 4 and rotatably supported by a support arm 61. The support arm 61 is provided with a plate spring 64 for biasing the clamp member 62 downward.

Prior to a detailed description of the constructions of various mechanisms, a disc loading operation will be described generally with reference to FIGS. 2A, 2B and 2C.

With the tray 2 withdrawn through the front 20 panel 11 as seen in FIG. 2A, discs 10 are placed on the tray 2, and a loading start button (not shown) on the front panel 11 is depressed, whereupon the loading motor 71 is started to operate the tray drive mechanism to be described later, whereby the tray 2 carrying the discs 10 is transported into the cabinet 1.

Figure 2B:
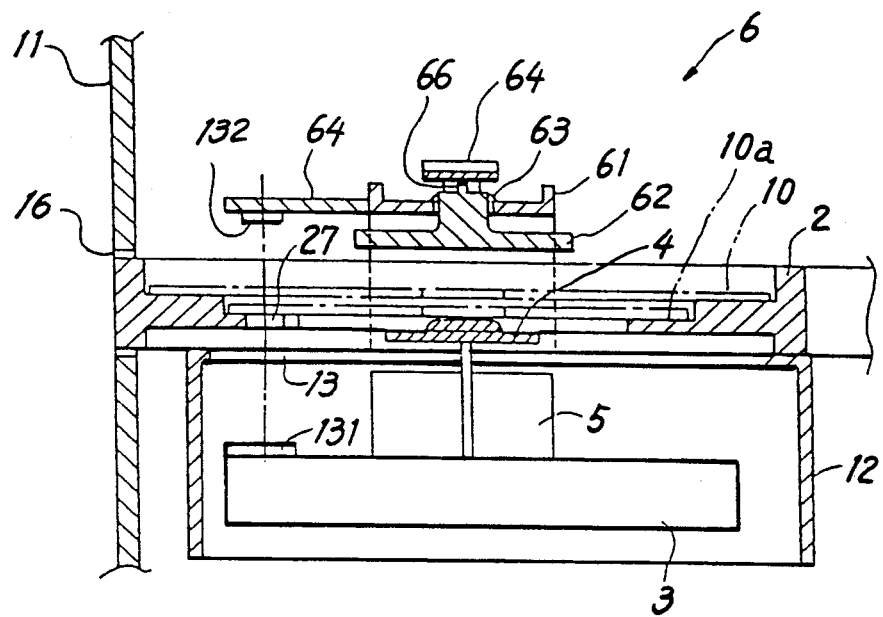

On completion of transport of the tray 2 as shown in FIG. 2B, the center of each disc 10 on the tray 2 is positioned above and in coincidence with the spindle of the turntable 4 on the movable chassis 3. In this state, the rotation of the loading motor 71 is transmitted to the chassis drive mechanism to be described later to drive the movable chassis 3 upward.

With this movement, the turntable 4 rises. During the rise, the turntable 4 lifts the disc 10 off the tray 2 first and further presses the disc 10 into contact with the clamp member 62. Consequently, under the action of the plate spring 64, the disc 10 is held between the turntable 4 and the clamp member 62, whereby the disc is completely loaded in place as seen in FIG. 3C.

Figure 2C:
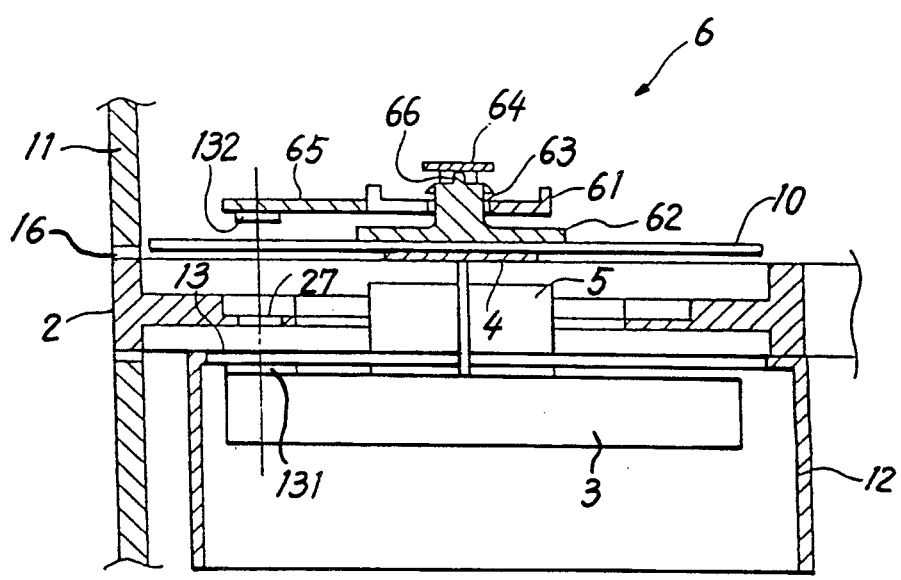

When an unloading start button (not shown) on the front panel 11 is depressed after the reproduction of signals, the loading motor 71 rotates in a direction opposite to the above to perform a disc unloading operation in the order of FIG. 2C, FIG. 2B and FIG. 2A.

Tray 2

Figure 3:
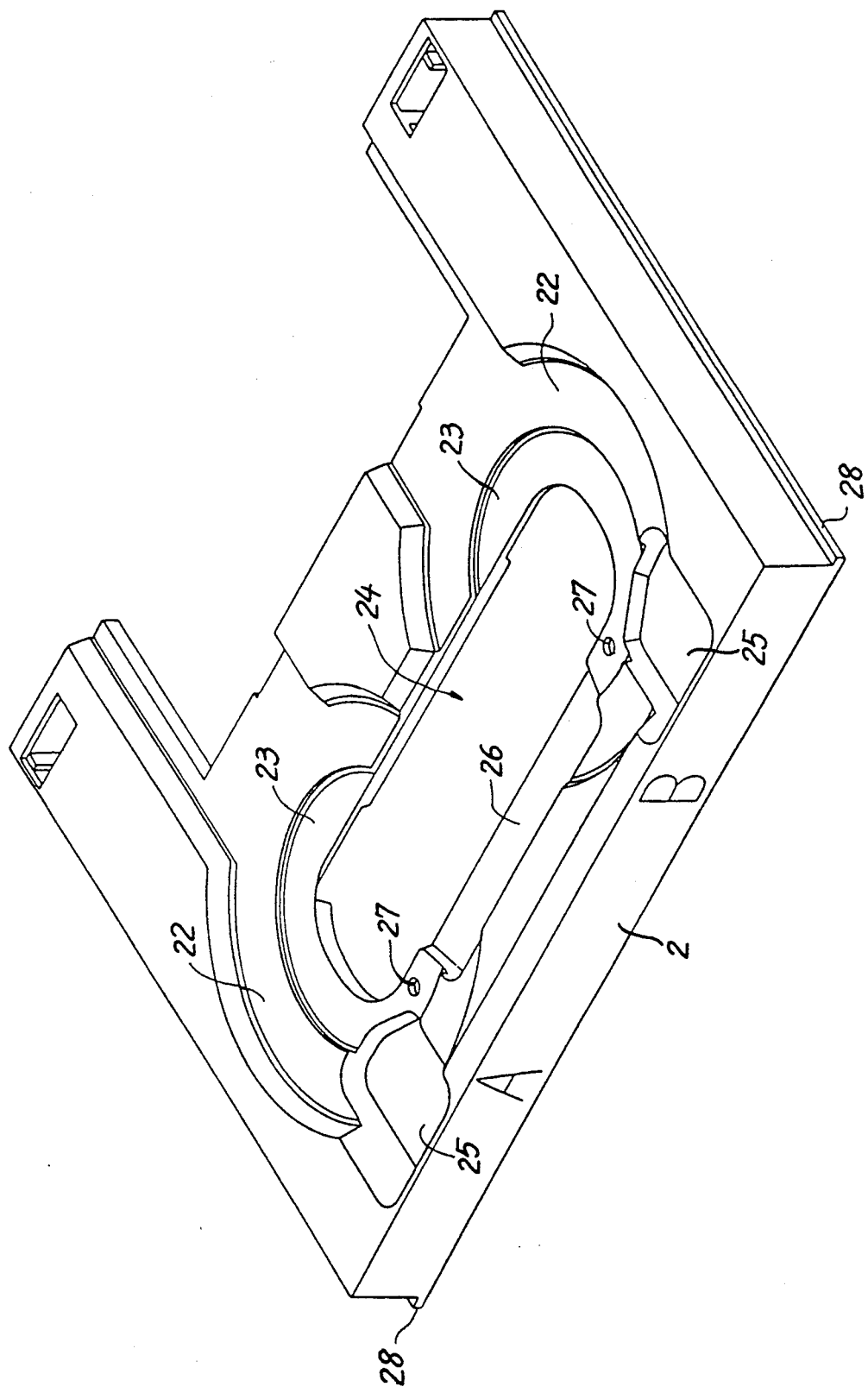
FIG. 3 is an enlarged perspective view of the tray.

With reference to FIGS. 3 and 4, the upper side of the tray 2 is recessed to provide a pair of first disc accommodating portions 22, 22 of a large diameter. Each of these portions 22 is further recessed centrally thereof to provide a second disc accommodating portion 23 of a small diameter. A compact disc, 12 cm in diameter, is to be accommodated in the first portion 22, and a compact disc, 8 cm in diameter, in the second portion 23.

The tray 2 is centrally formed with a cutout 24 extending laterally across the central portions of the pair of second disc accommodating portions 23, 23. With the rise of the movable chassis 3, the pair of turntables 4, 4 and the pickup 5 shown in FIG. 5 advance into the cutout 24.

Further as seen in FIGS. 3 and 4, each of the second disc accommodating portions 23 is formed with a hole 27 for the light of a disc detecting photocoupler to pass therethrough.

The upper side of the tray 2 is also recessed to a greater depth than the second portion 23 to provide a stepped portion 26 positioned closer to the tray front end than the cutout 24 and extending along the cutout 24. The tray upper side is further recessed at its front portion to a greater depth than the second disc accommodating portion 23 to provide a pair of cavities 25, 25 each positioned on a radial line extending from the center of the portion 23 at an angle of 45 degrees with the direction of movement of the tray outwardly thereof. The stepped portion 26 and the cavity 25 are so positioned as to overlap the first disc accommodating portion 22 and the second disc accommodating portion 23.

Accordingly, the user can easily hold the disc when removing the disc from the first or second portion 22 or 23 by engaging the index finger with the inner periphery of the disc and the thumb with the outer peripheral edge thereof utilizing the cavity 25 or the stepped portion 26.

As seen in FIG. 3, the front end face of the tray 2 is marked with the symbols "A" and "B" in corresponding relation with the pair of disc support portions, respectively, for identifying these portions.

Tray Drive Mechanism 21

The tray 2 is formed on the respective opposite sides thereof with a pair of ridges 28, 28 extending along the direction of movement of the tray. These ridges 28 are slidably in engagement with four L-shaped retainers 18 mounted on the fixed chassis 12 at opposite side portions thereof, two retainers 18 on each side portion, whereby the tray 2 is guided for reciprocating movement in the directions of arrows A, A' as seen in FIG. 5.

Figure 7:
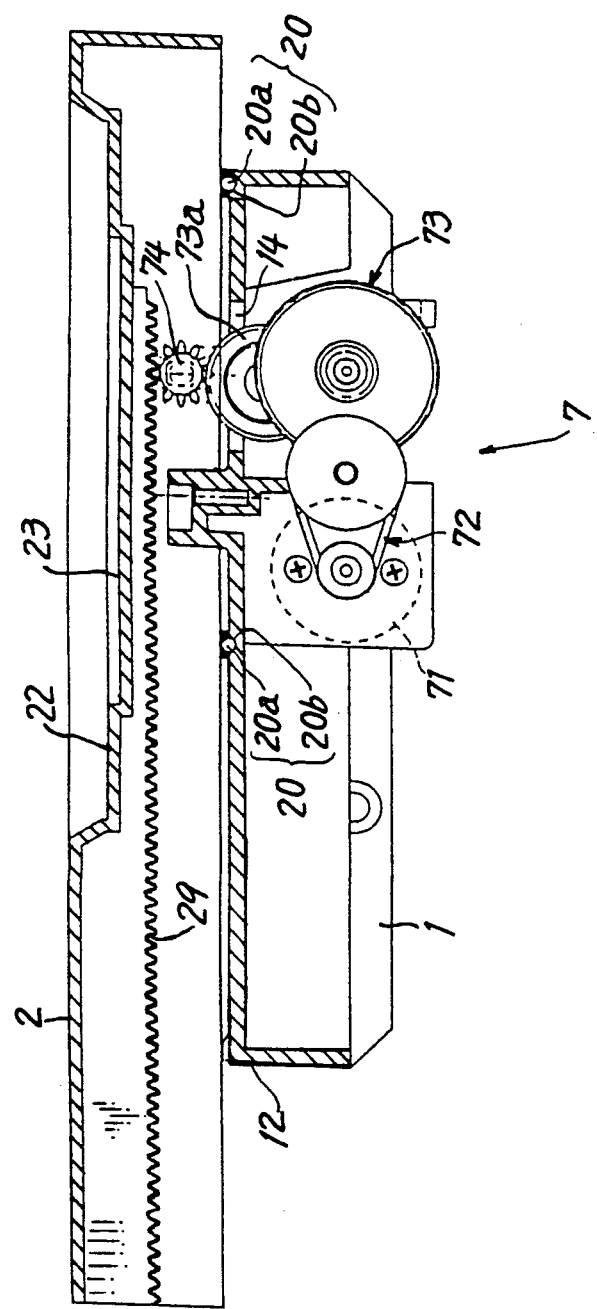
FIG. 7 is a view in section taken along the line B—B in FIG. 5 and showing a power transmission for transmitting the power of a loading motor to a drive gear.

A plurality of ball bearings 20, each comprising a ball socket 20b and a ball 30a rollably fitted therein as shown in FIG. 7, are arranged on the surface of the fixed chassis 12 slidingly supporting the tray thereon. This renders the tray 2 smoothly movable in reciprocation.

Figure 6:
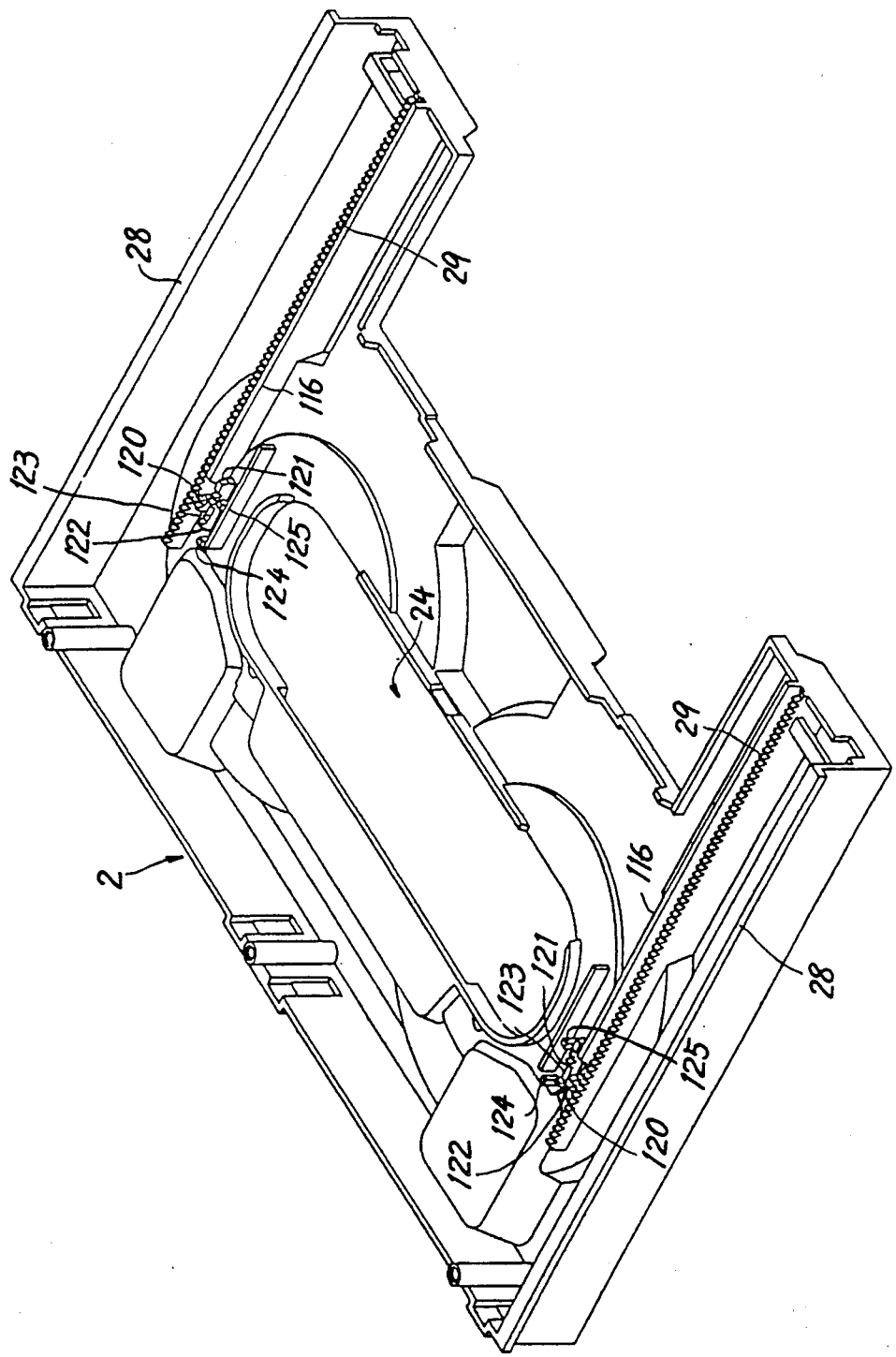
FIG. 6 is a perspective view showing the rear side of the tray.

As seen in FIG. 6, the tray 2 is provided on the rear side thereof with a pair of opposed racks 29, 29 extending along the direction of tray movement.

As shown in FIG. 5, a connecting shaft 75 extending laterally is rotatably supported on the fixed chassis 12. The shaft 75 fixedly carries at its opposite ends a pair of drive gears 74, 74 meshable with the respective racks 29, 29 on the tray 2. The loading motor 71 is fixed to the rear side of the fixed chassis 12 as seen in FIG. 7. The output shaft of the motor 71 is coupled to reduction gear means 73 via pulley means 72. The gear means 73 includes a terminal gear 73a projecting upward through a hole 14 in the fixed chassis 12 and meshing with one of the drive gears 74 at all times.

Thus, the power of the loading motor 71 is transmitted to the racks 29, 29 on the tray 2 via the above transmission mechanism 7 while the racks 29 are in mesh with the respective drive gears 74 on the fixed chassis 12, whereby the tray 2 is driven reciprocatingly.

When the tray has been driven to a position immediately adjacent to the disc loading end of path of movement thereof, the drive gear 74 is in mesh with the rack 29 at the terminal end thereof. Upon the tray 2 reaching the loading end, the rack 29 is brought out of meshing engagement with the drive gear 74.

Movable Chassis 3 and Chassis Drive Mechanism 9

With reference to FIG. 5, the movable chassis 3 is liftably disposed in a rectangular opening 13 formed in the fixed chassis 12 centrally thereof.

Figure 9:
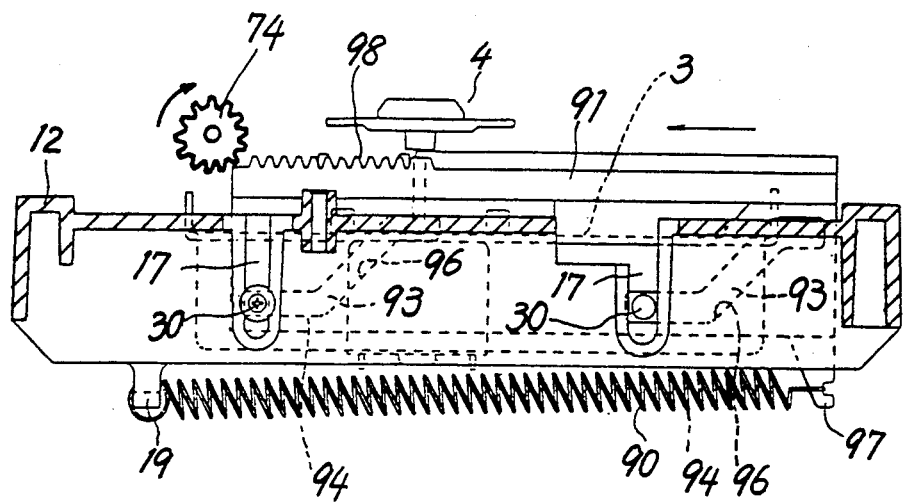
FIG. 9 is a view in section taken along the line C—C in FIG. 5 and showing the fixed chassis, the movable chassis in its lowered position and the drive member.
Figure 10:
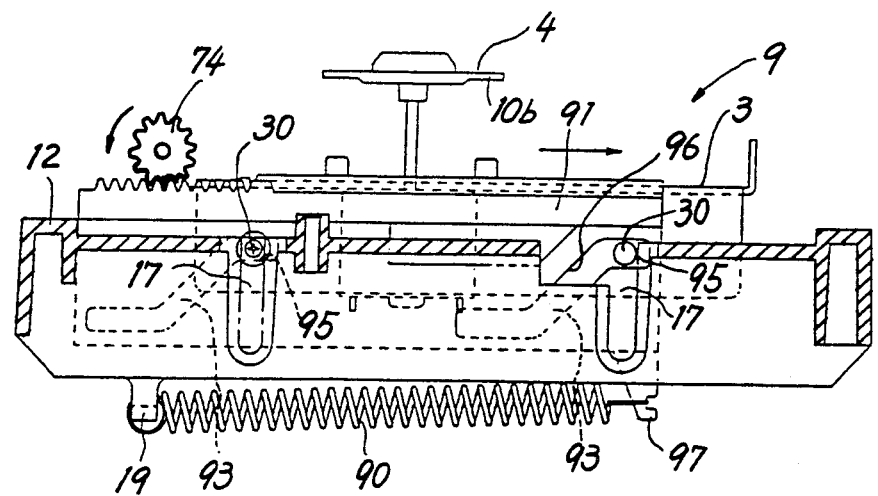
FIG. 10 is a view in section taken along the line C—C in FIG. 5 and showing the fixed chassis, the movable chassis in its raised position and the drive member.
Figure 15:
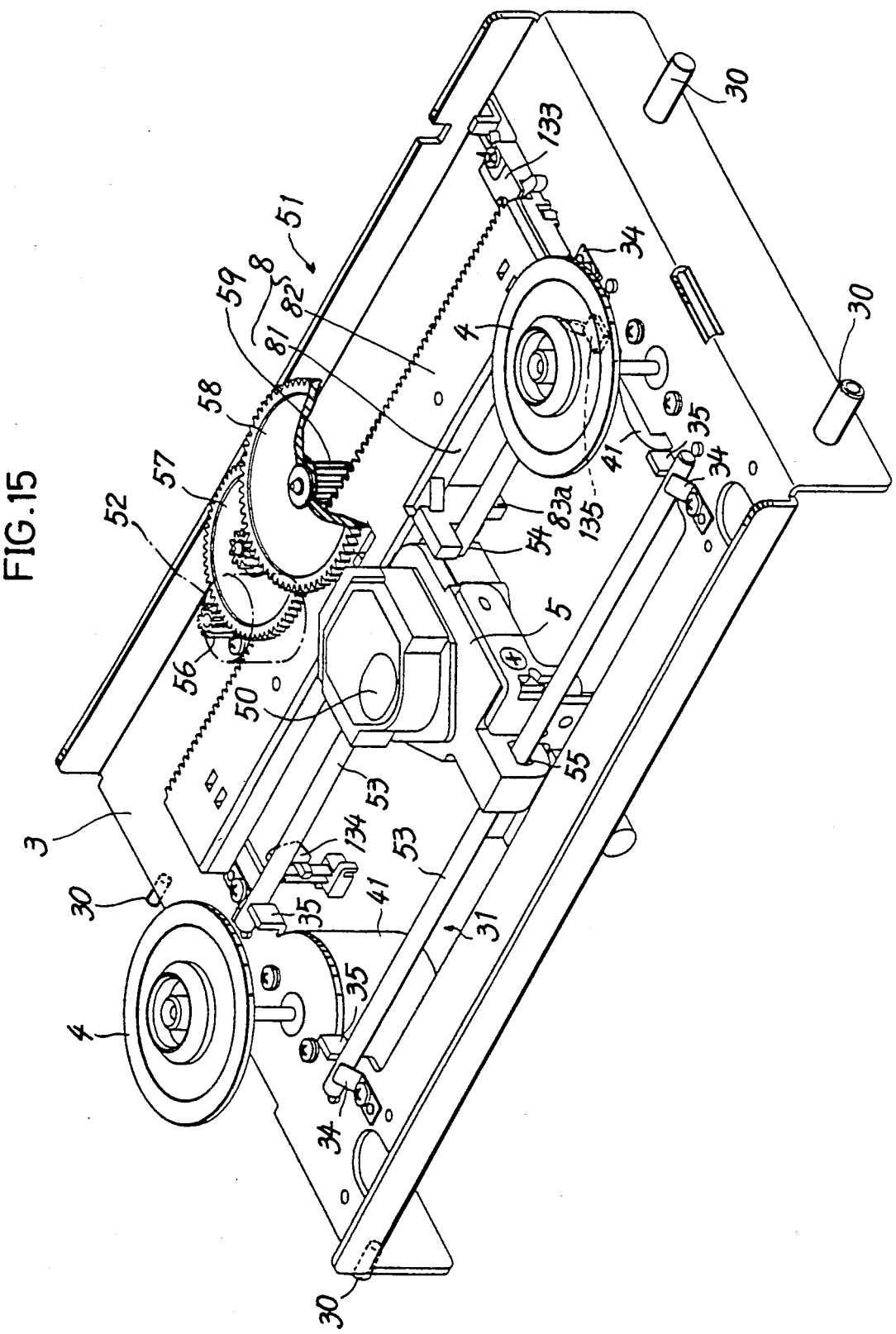
FIG. 15 is a perspective view partly broken away and showing mechanisms on the movable chassis.

As shown in FIG. 15, two pins 30 project outward from each side of the movable chassis 3. As shown in FIGS. 9 and 10, these pins 30 slidably fit in respective vertical guide grooves 17 formed in the fixed chassis 12 to guide the upward and downward movement of the movable chassis 3 in a horizontal position.

To drive the movable chassis 3 upward and downward along the guide grooves 17, a pair of opposed drive members 91, 91 movable forward and rearward along the fixed chassis 12 are arranged at the respective sides of the opening 13 in the fixed chassis 12.

Figure 8:
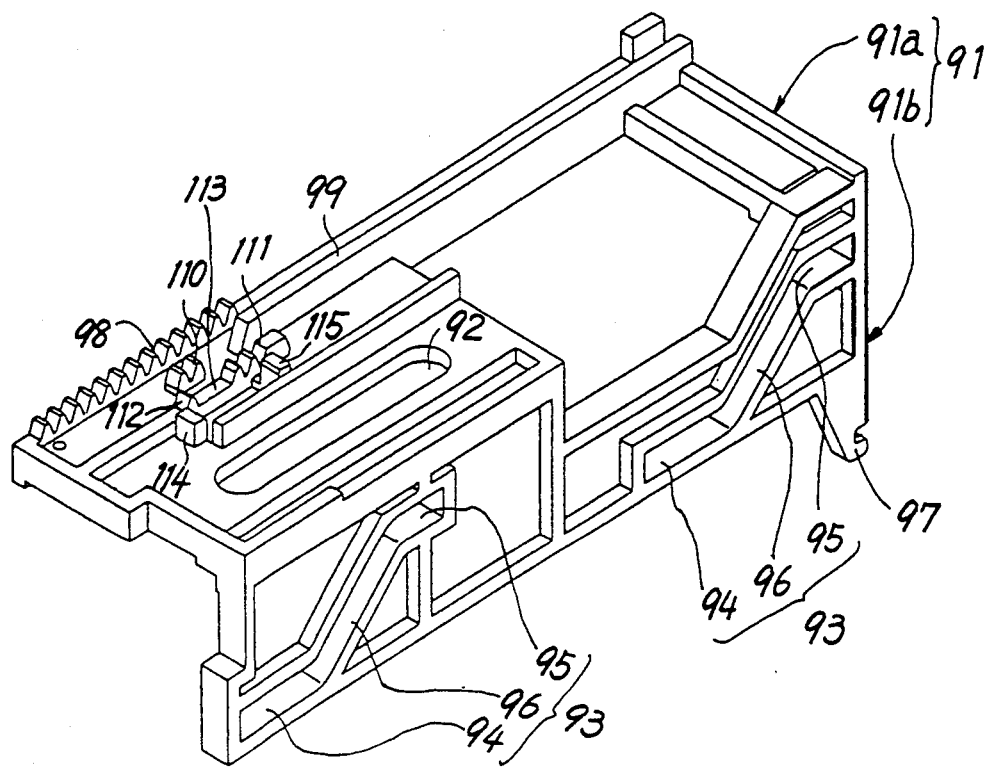
FIG. 8 is a perspective view of a drive member constituting a chassis drive mechanism.

With reference to FIG. 8, each drive member 91 comprises a horizontal plate 91a and a vertical plate 91b. The horizontal plate 91a is formed with a slot 92 extending in the front-to-rear direction, while the vertical plate 91b is formed with a pair of cam slots 93, 93 each extending in the form of a stair in this direction. Each cam slot 93 comprises two horizontal portions 94, 95 at different levels, and a slanting portion 96 interconnecting the two portions. A rack portion 98 meshable with the drive gear 74 is formed on the upper surface of the horizontal plate 91a.

As shown in FIG. 5, the pair of drive members 91, 91 are mounted on the fixed chassis 12 forwardly and rearwardly movably. A screw 92a extends through the slot 92 in each drive member 91 and is driven into the fixed chassis 12. The screw 92a guides the linear movement of the drive member 91.

With reference to FIG. 9, the two pins 30 projecting from each side of the movable chassis 3 extend through the respective cam slots 93 in the drive member 91 and are fitted in the guide grooves 17 in the fixed chassis 12.

Accordingly, with the drive gear 74 in mesh with the rack portion 98 of the drive member 91, the power of the loading motor 71 is transmitted to the rack portion 98, whereby the drive member 91 is driven forward and rearward reciprocatingly.

FIG. 9 shows the movable chassis 3 as located in its lowered position, with the drive member 91 in a rearwardly (rightwardly, in the illustration) moved limit position. When the drive member 91 moves forward from this position as indicated by an arrow, the pins 30 are forced upward by the slanting slotted portions 96 defining the cam slots 93 with the movement of the slots 93, whereby the movable chassis 3 is lifted along the guide grooves 17. Upon the drive member 91 reaching a forwardly moved limit position, the pins 30 are positioned in the horizontal portions 95 of the cam slots 93, holding the movable chassis 3 in its raised position.

The drive member 91 and the fixed chassis 12 respectively have hooks 97, 19 projecting downward therefrom and spaced apart from each other in the direction of movement of the member 91, with a spring 90 connected between these hooks 97, 19. This diminishes the load involved in the lift of the movable chassis 3 by the drive member 91.

The chassis drive mechanisms 9, 9 provided at the opposite sides of the movable chassis 3 are identical with respect to the construction described above.

The drive member 91 drives the movable chassis 3 downward by an operation reverse to that for lifting the chassis 3. When the drive member 91 moves from the position of FIG. 10 rearward as indicated by an arrow, the pins 30 are forced down by the cam-defining slanting slotted portions 96, whereby the movable chassis 3 is lowered eventually to the position shown in FIG. 9.

Intermediate Gear Mechanism 100

Next, a description will be given of an intermediate gear mechanism 100 for smoothly transmitting the power of transmission 7 shown in FIG. 7 to the chassis drive mechanism 9 as changed-over from the tray drive mechanism 21.

Figure 11:
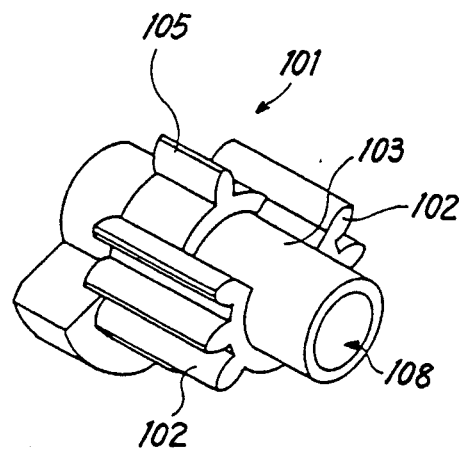
FIG. 11 and FIG. 12 are enlarged perspective views showing an intermediate gear as it is seen from different directions.
Figure 12:
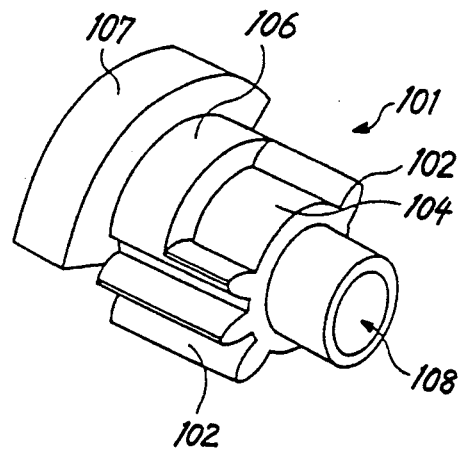

With reference to FIG. 5, a pair of opposed intermediate gears 101, 101 having a rotary shaft in parallel to the connecting shaft 75 are rotatably supported on the fixed chassis 12 respectively at opposite sides of the movable chassis 3. As shown in FIGS. 11 and 12, each intermediate gear 101 has a pair of main gear portions 102, 102 positioned at its periphery in back-to-back relationship to each other and each composed of three teeth, first and second toothless portions 103, 104 formed between the main gear portions, a trigger gear portion 105 in the form of a single tooth and formed on the first toothless portion 103 at one side thereof closer to the movable chassis (at the left in FIG. 11), a first circular-arc portion 106 formed over the second toothless portion 104 at one side thereof closer to the movable chassis, and a second circular-arc portion 107 diametrically larger than the first circular-arc portion 106 and formed at one side of the portion 106 closer to the movable chassis. The intermediate gear 101 has a bore 108 extending centrally therethrough for a shaft to fit in.

Figure 6A:
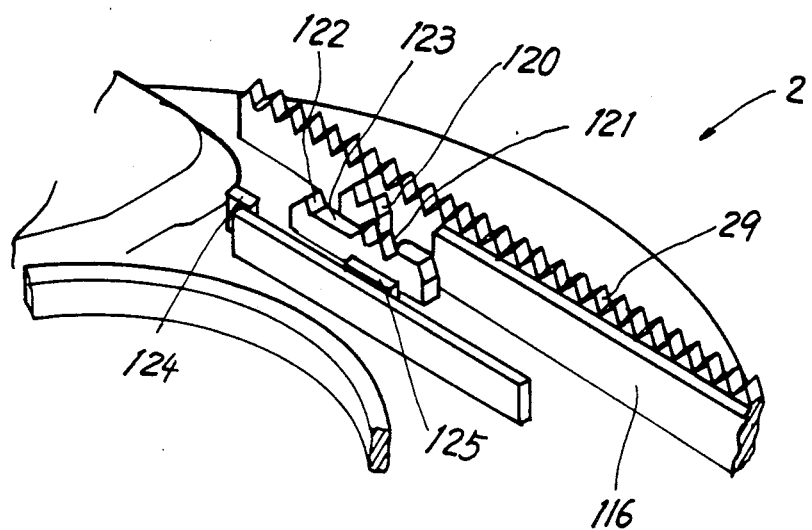
FIG. 6A is an enlarged perspective view of a gear mechanism provided on the rear side of the tray.

With reference to FIG. 6 and FIG. 6A, formed on the rear side of the tray 2 are a first gear portion 120 in the form of two teeth and positioned inwardly of the terminal end of each rack 29, and a ridge 116 extending along the rack 29 from a position a specified distance away from the first gear portion 120. Further formed on the tray rear side inwardly of the first gear portion 120 are a second gear portion 121 in the form of three teeth, a toothless portion 123 extending along the first gear portion 120 and having a predetermined length, and a third gear portion 122 in the form of a single tooth. These portions 121 to 123 are arranged in a row. Further formed inwardly of the second and third gear portions 121, 122 are a first projection 124 and a second projection 125 which are spaced apart by a predetermined distance.

With reference to FIG. 8, formed on the upper face of the horizontal plate 91a of the drive member 91 inwardly of the rack portion 98 are a first gear portion 110 in the form of two teeth, and a ridge 99 extending longitudinally of the member 91 from a position a specified distance away from the first gear portion 110. Further formed inwardly of the first gear portion 110 are a second gear portion 111 in the form of three teeth, a toothless portion 113 extending along the first gear portion 110 and having a predetermined length, and a third gear portion 112 in the form of a single tooth. These portions 111 to 113 are arranged in a row. Further formed inwardly of the second and third gear portions 111, 112 are a first porjection 114 and a second projection 115 which are spaced apart by a predetermined distance.

When the tray 2 has been assembled on the fixed chassis 12, the first gear portion 120 of the tray 2 and the first gear portion 110 of the drive member 91 are positioned within the same vertical plane as the main gear portions 102 of the intermediate gear 101. The second and third gear portions 121, 122 of the tray 2 and the second and third gear portions 111, 112 of the drive member 91 are positioned on the same vertical plane as the main gear portions 102 and the trigger gear portion 105 of the intermediate gear 101. Further the first and second projections 124, 125 of the tray 2 and the first and second projections 114, 115 of the drive member 91 are positioned on the same vertical plane as the second circular-arc portion 107 of the gear 101.

The operation of the intermediate gear mechanism 100 will be described below with reference to FIGS. 13A to 13E.

Figure 13A:
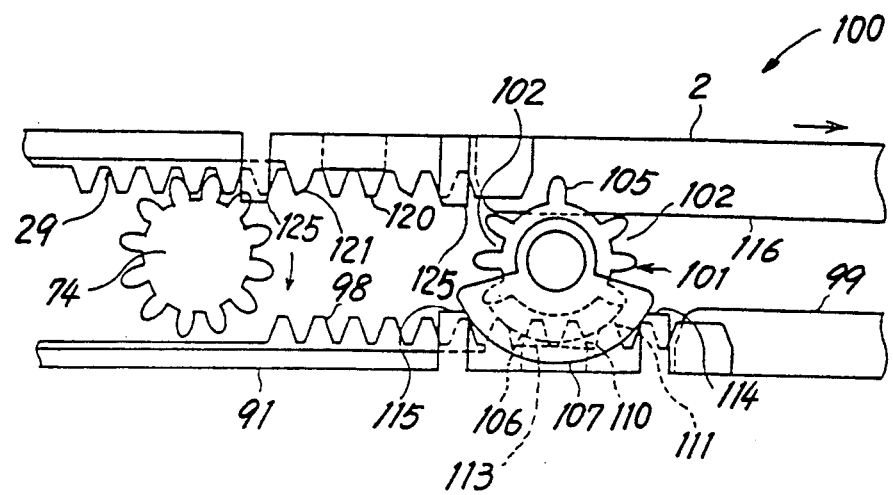
FIGS. 13A to 13E are a series of side elevations showing a change-over operation from tray drive to movable chassis drive effected by an intermediate gear mechanism.

FIG. 13A shows the drive gear 74 in clockwise rotation in mesh with the rack 29 on the tray 2, driving the tray 2 toward the disc loading direction (the direction of arrow shown). In this state, the first and second circular-arc portions 106 and 107 are respectively in engagement with the toothless portion 113 and the portion between the projections 114, 115 of the drive member 91, and the first toothless portion 103 of the gear 101 is in engagement with the ridge 116 of the tray 2, whereby the intermediate gear 101 is restrained from rotation, but the tray 2 is allows to move. The drive member 91 is prevented from moving by the first and second circular-arc portions 106, 107 of the intermediate gear 101. Consequently, the movable chassis 3 is held locked in its lowered position.

Figure 13B:
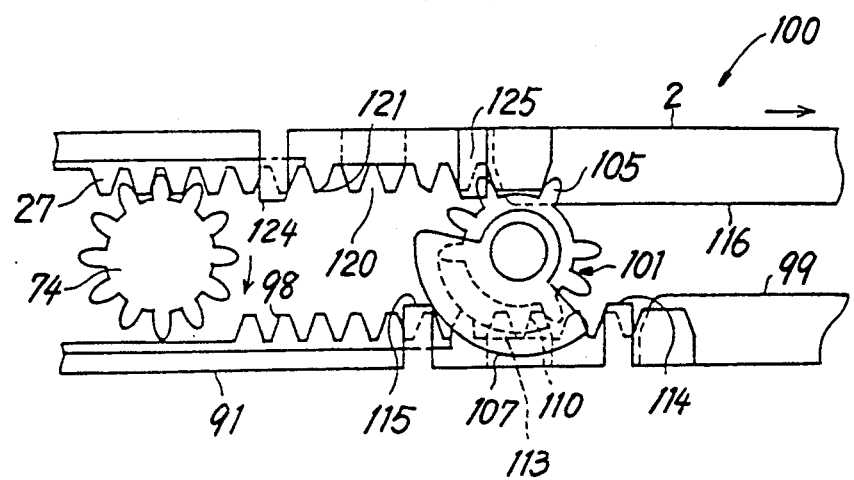

When the tray 2 is moved toward the loading completed position after it has been brought to a position a short distance to the front of the completed position by the rotation of the drive gear 74, the end of the second gear portion 121 of the tray first comes into contact with the trigger gear portion 105 of the intermediate gear 101 as seen in FIG. 13B, further pushing the gear portion 105 to rotate the gear 101 clockwise.

Figure 13C:
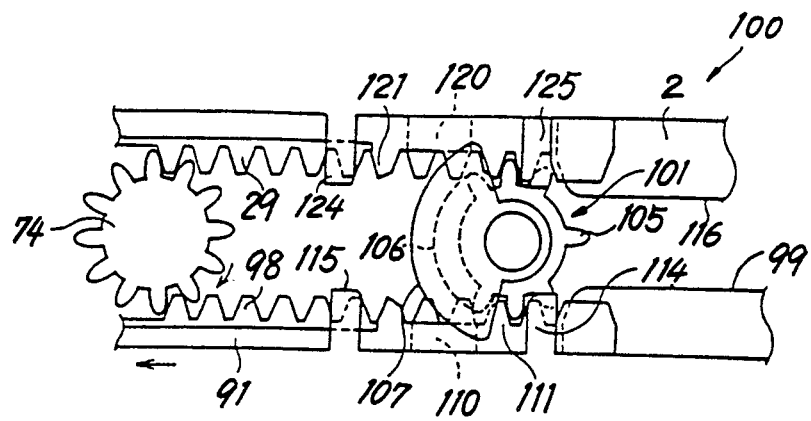

When the tray 2 further moves, the end of the first main gear portion 102 of the intermediate gear 101 pushes the end of the first gear portion 110 of the drive member 91 as shown in FIG. 13C to move the drive member 91 leftward in the drawing, with the result that the first main gear portion 102 meshes with the second gear portion 111 of the drive member 91. At the same time, the second main gear portion 102 of the intermediate gear 101 meshes with the second gear portion 121 of the tray 2. In this state, the drive gear 74 has completed engagement with the rack 29 on the tray 2 and is about to come into meshing engagement with the rack portions 98 on the drive member 91.

Accordingly, with continued clockwise rotation of the drive gear 74 from the state of FIG. 13C, the drive member 91 is driven leftward in the drawing. With this movement, the drive member second gear portion 111 moves leftward, which in turn rotates the intermediate gear 101 clockwise.

At this time, the second main gear portion 102 of the intermediate gear 101 is in mesh with the second gear portion 121 of the tray 2, so that the rotation of the gear 101 further drives the tray rightward.

Figure 13D:
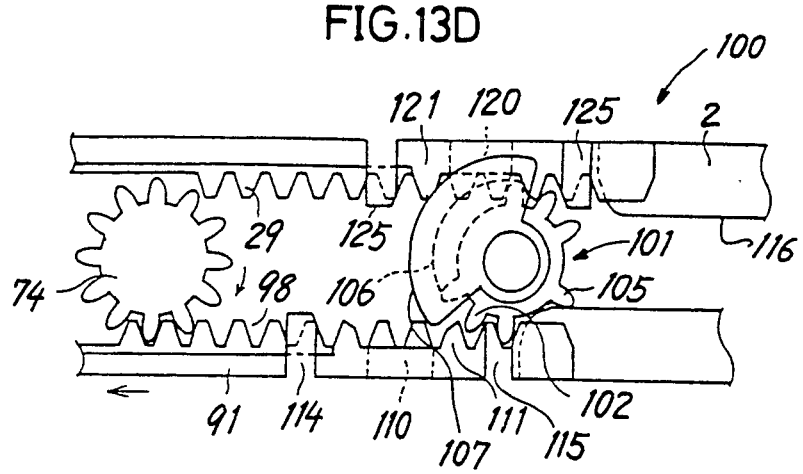

Immediately thereafter, the drive gear 74 is released from the meshing engagement with the rack 29 on the tray 2 as shown in FIG. 13D.

Figure 13E:
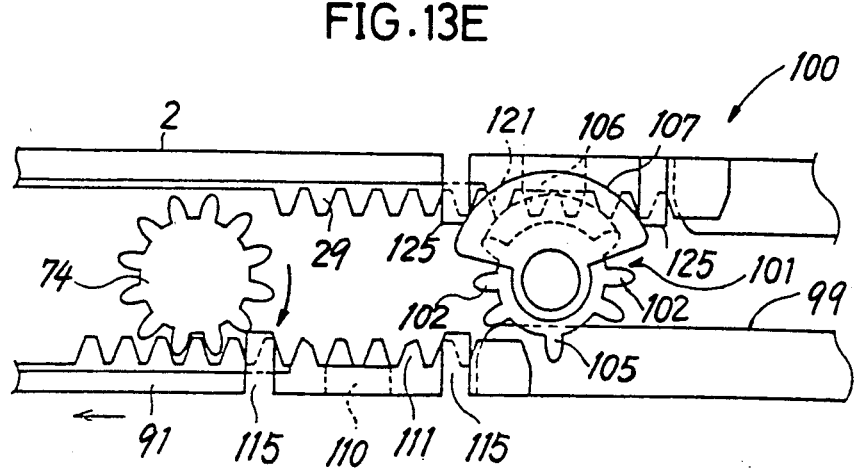

When the drive member 91 moves further leftward, the first and second circular-arc portions 106 and 107 of the intermediate gear 101 come into engagement with the toothless portion 123 of the tray 2 and with the portion between the projections 124, 125 thereof, respectively, and the first toothless portion 103 of the intermediate gear 101 engages with the ridge 99 of the drive member as seen in FIG. 13E. Consequently, the tray 2 is locked in the loading completed position shown in FIG. 13E.

The drive member 91 is driven leftward by the drive gear 74 also thereafter, whereby the movable chassis 3 is lifted as already described. In the meantime, the first toothless portion 103 of the intermediate gear 101 remains in engagement with the ridge 99 on the drive member 91, whereby the gear 101 is restrained from rotation to hold the tray 2 locked.

The operation of the intermediate gear mechanism 100 to lower the movable chassis 3 from its raised position and to withdraw the tray 2 for disc unloading is reverse to the above operation thereof for disc loading and proceeds from the state of FIG. 13E to the states of FIGS. 13D, 13C, 13B and finally back to the state of FIG. 13A.

More specifically, the drive gear 74 rotates counterclockwise to move the drive member 91 rightward in FIG. 13E, whereupon the end of the second gear portion 111 of the drive member 91 first pushes the trigger gear portion 105 of the intermediate gear 101, rotating the gear 101 counterclockwise as shown in FIG. 13D.

As the drive gear 74 further rotates, the main gear portions 102, 102 of the intermediate gear 101 come into meshing engagement with the drive member second gear portion 111 and the tray second gear portion 121, respectively, as in FIG. 13C, whereby the power of the drive gear 74 is transmitted to the tray 2 via the drive member 91 and the intermediate gear 101 to drive the tray 2 leftward.

When the drive gear 74 meshes with the tray rack 29, the power of the gear 74 is now delivered to the drive member 91 via the tray rack 29 and the intermediate gear 101. The drive member 91 is driven further rightward as in FIG. 13B, whereby the movable chassis 3 is driven to its lowered position.

With continued counterclockwise rotation of the drive gear 74, the first and second circular-arc portions 106, 107 of the intermediate gear 101 come into meshing engagement with the toothless portion 113 of the drive member 91 and with the portion between the projections 114, 115 thereof, respectively, as in FIG. 13A, whereby the movable chassis 3 is locked in its lowered position.

In this state, the drive gear 74 operates to deliver the tray 2 outward.

Disc Clamp Mechanism 6

Figure 5A:
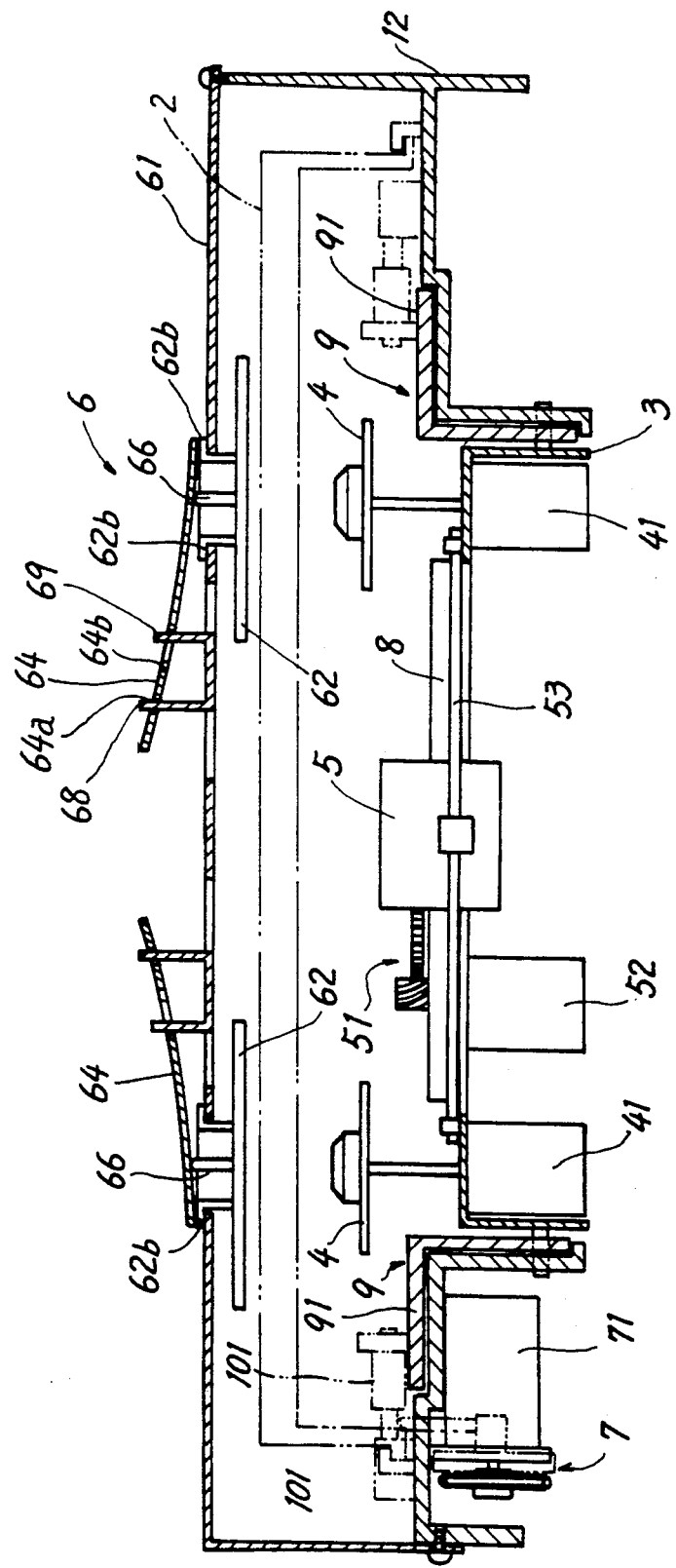
FIG. 5A is a view in section taken along the line D—D in FIG. 5 and showing the disc player.
Figure 14:
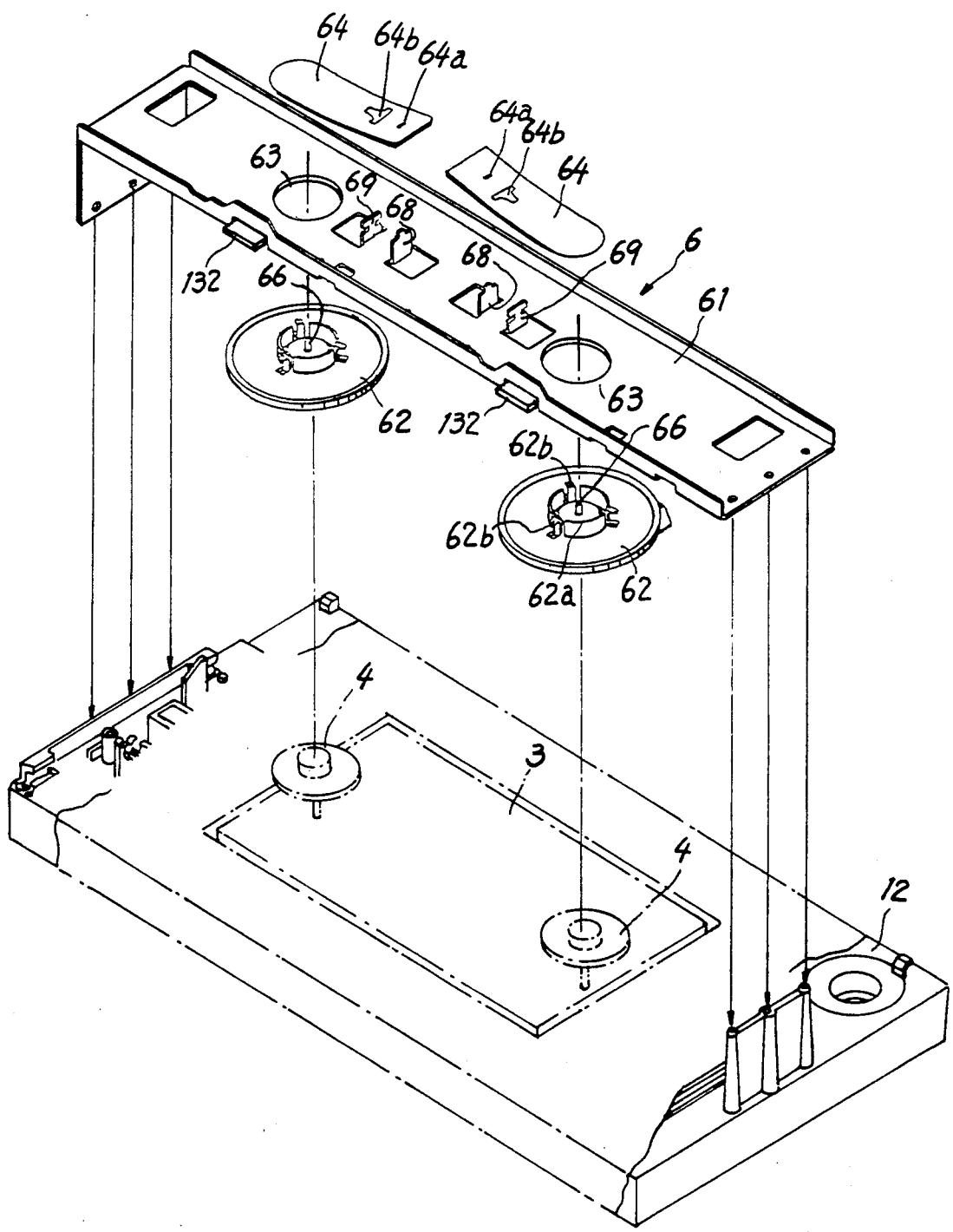
FIG. 14 is an exploded perspective view of the disc clamp mechanism.

With reference to FIGS. 5A and 14, a disc clamp mechanism 6 comprises a support arm 61 mounted on the fixed chassis 12, and a pair of clamp members 62, 62 rotatably supported by the arm 61.

Each clamp member 62 comprises a plurality of circular-arc upright pieces 62a arranged in a circular form on its upper side, a plurality of elastic claws 62b arranged between the pieces 62a, and an upward projection 66 having a ball-shaped upper end and provided centrally of the member 62.

The support arm 61 is formed with a pair of cicular holes 63, 63 positionable above the respective turntables 4, 4 coaxially therewith and provided for the clamp members 62, 62, respectively, for the upright pieces 62 and the claws 62b to engage in. In the vicinity of each hole 63, two lanced lugs 68, 69 are provided for attaching a plate spring 64 thereto.

The plate spring 64 is formed with apertures 64a, 64b for the lugs 68, 69 to engage in. When the spring 64 is attached to the support arm 61 with the lugs 68, 69 engaged in the apertures 64a, 64b, the spring 64 is warped and bears on the upper end of the projection 66 of the clamp member 62. The spring presses the clamp member 62 downward with the elasticity afforded by the warp.

FIG. 2C shows that the disc 10 on the tray 2 is pressed against the clamp member 62 by the turntable 4 in its raised position. In this state, the clamp member 62 is slightly raised above its lowered position against the plate spring 64. The disc 10 is held between the clamp member 62 and the turntable 4 by the elastic force of the spring 64. Accordingly, when the turntable 4 rotates, the clamp member 62 rotates with the disc 10 and the turntable 4, as supported by the projection 66.

Pickup Transport Mechanism

Figure 16:
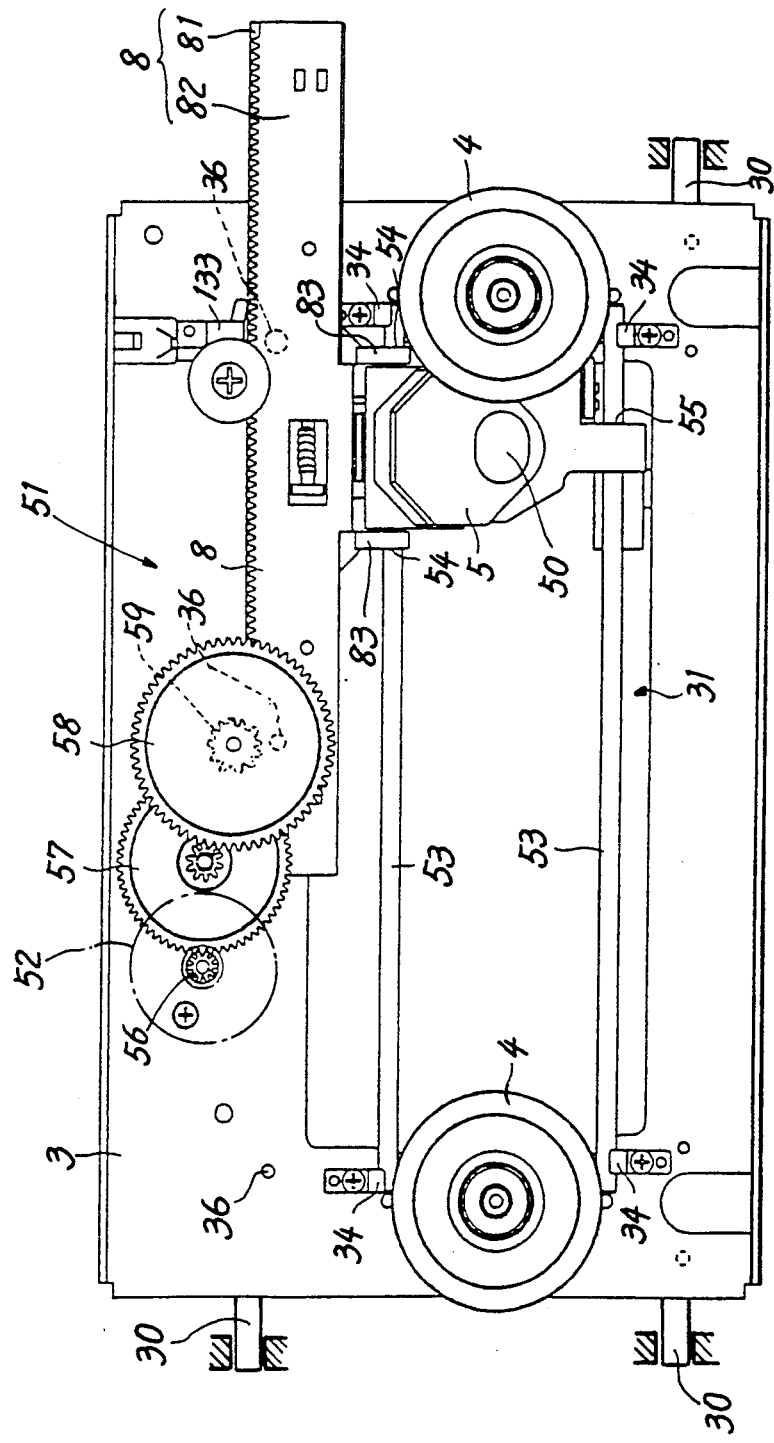
FIG. 16 is a plan view of the same.

With reference to FIGS. 15 and 16, an opening 31 formed in the movable chassis 3 centrally thereof is provided with a pair of guide shafts 53, 53 in parallel to each other and also in parallel to a line through the centers of rotation of the two turntables 4, 4. Each shaft 53 is clamped at each end thereof between a spring plate 34 and a lug 35 and is thereby secured to the movable chassis 3.

The guide shafts 53, 53 slidably extend through bores 54, 55 formed in the body of the pickup 5 in intimate contact therewith to guide the pickup 5 for an accurate linear movement. In this state, the optical center of an objective lens 50 of the pickup 5 is positioned on the line through the centers of rotation of the turntables 4, 4 and moves on this line.

A pickup transport assembly 61 reciprocatingly drives a rack assembly 8 mounted on the movable chassis 3 with the power of a feed motor 52 attached to the lower side of the movable chassis 3, whereby the pickup 5 coupled to the rack assembly 8 is transported from a position close to one of the turntables 4 to a position close to the other turntable along the guide shafts 53.

A drive gear 56 is fixed to the output shaft of the feed motor 52. The rotation of the drive gear 56 is subjected to a speed reduction by a first driven gear 57 and a second driven gear 58 on the movable chassis 3. A pinion 59 attached to the second driven gear 58 is in mesh with the gear portion of the rack assembly 8 at all times.

Disposed on the movable chassis 3 is a sensor switch 144 which is actuated when the pickup 5 is brought to the middle position in the range of its movement by the rack assembly 8.

As seen in FIG. 15, the rack assembly 8 comprises a first rack 81 and a second rack 82 superposed thereon and connected thereto by a spring (not shown) as will be described later.

Figure 18:
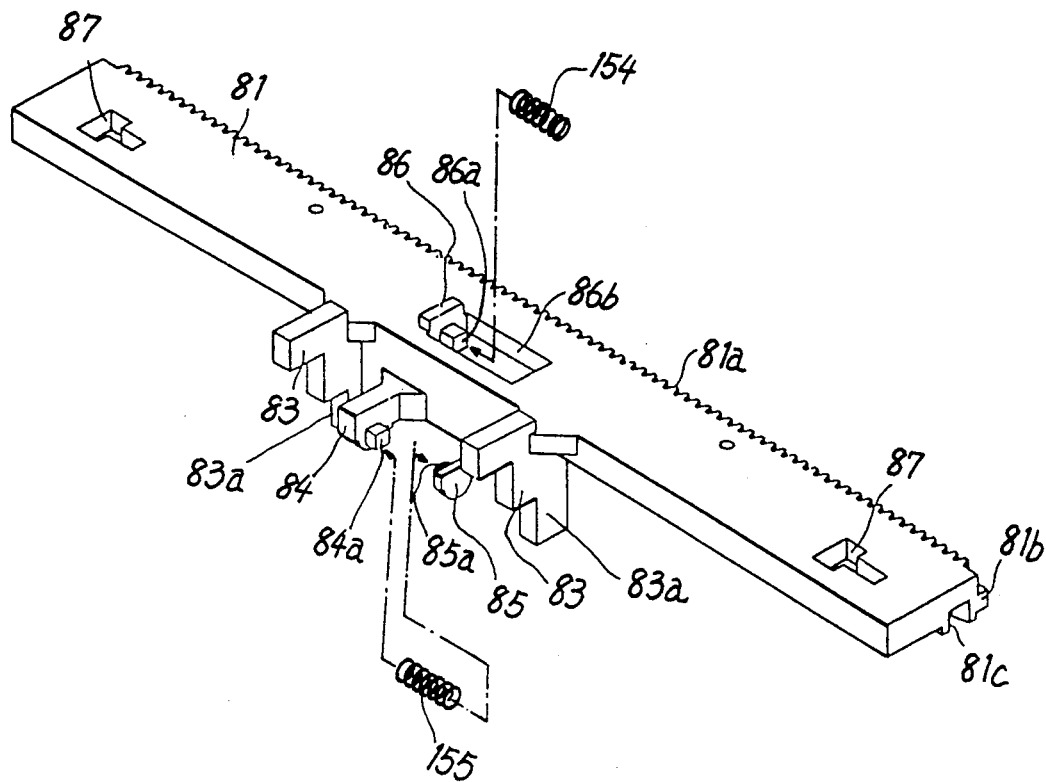
FIG. 18 is a perspective view of a first rack.

With reference to FIG. 18, the first rack 81 has a gear portion 81a formed on the upper half of its one side face, and a ridge 81b formed on the lower half of the side face and having approximately the same height as the teeth of the gear portion 81a. The gear portion 81a and the ridge 81b extend over the entire length of the rack 81. The first rack 81 has a pair of holders 83, 83 spaced apart by a specified distance and projecting forward from the other side face thereof. Pieces 83a, 83a project downward from the holders 83, 83, respectively. Between these holders 83, 83, the first rack 81 has a pair of pieces 84, 85 spaced apart by a specified distance and projecting forward therefrom. The projecting pieces 84, 85 are formed on their inner faces a pair of protrusions 84a, 85a opposed to each other.

The first rack 81 has an opening 86b centrally thereof. One side portion of the rack plate defining 20 this opening extends upward to provide a projection 86 and is formed with an inward protrusion 86a. A T-shaped apertures 87 is formed in each of opposite end portions of the first rack 81.

A guide groove 81c extending along the ridge 81b is formed in the rear side of the first rack 81.

Figure 19:
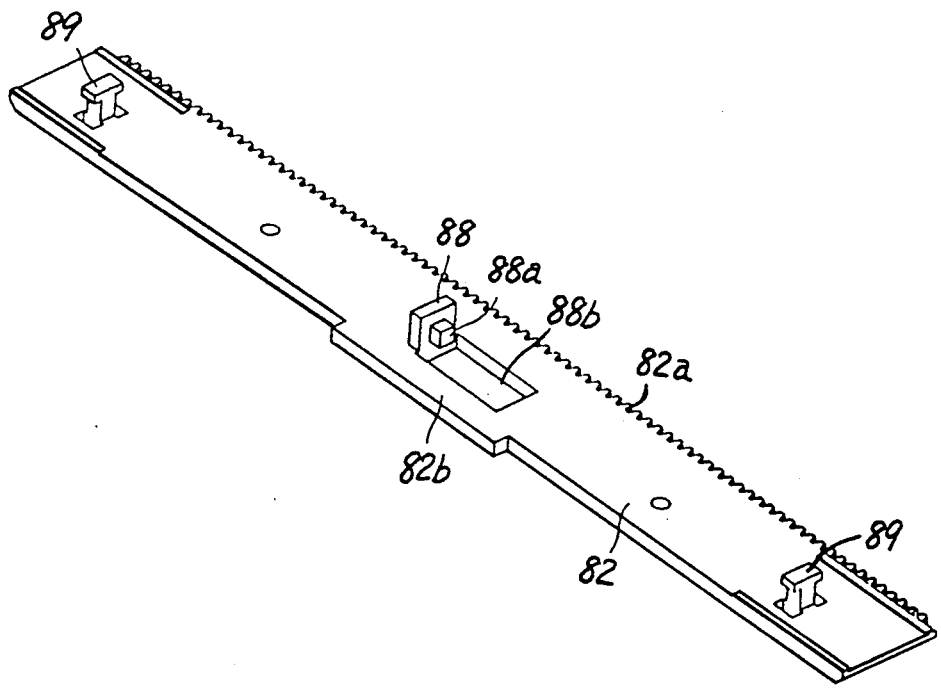
FIG. 19 is a perspective view showing a second rack as turned upside down.

FIG. 19 shows the second rack 82 as turned upside down. The second rack 82 has on one side face thereof a gear portion 82a extending over its entire length and on the other side face a forward projection 82b at the midportion thereof.

With reference to FIG. 19, the second rack 82 has an opening 88b centrally thereof. One side portion of the rack plate defining the opening 88b extends upward to provide a projection 88, which has on its inner surface an inward protrusion 88a. A pair of engaging pieces 89, 89 each having an enlarged end are formed on the upper side of the second rack 82 at the respective end portions.

To assemble the first and second racks 81, 82, the second rack 82 as shown in FIG. 19 is turned upside down longitudinally thereof, and the engaging pieces 89, 89 of the second rack 82 are inserted into the enlarged portions of the respective apertures 87, 87 in the first rack 81 from above the first rack 81. Consequently, the projection 88 of the second rack 82 is inserted into the opening 86b of the first rack 81, and the protrusions 86a and 88a of the two racks are opposed to each other within the opening 86b. The two racks 81, 82 are thereafter slidingly moved relative to each other so as to position the engaging pieces 89, 89 in the constricted portions of the apertures 87, 87, whereby the two racks are unremovably engaged with each other while being allowed to move relative to each other longitudinally within a given range.

A first spring 154 is then placed as compressed between the protrusions 86a, 88a of the first and second racks to bias the two racks 81, 82 away from each other. As a result, the pitch lines of the two racks are aligned with each other as shown in FIG. 16 with their gear portions out of phase.

Figure 17:
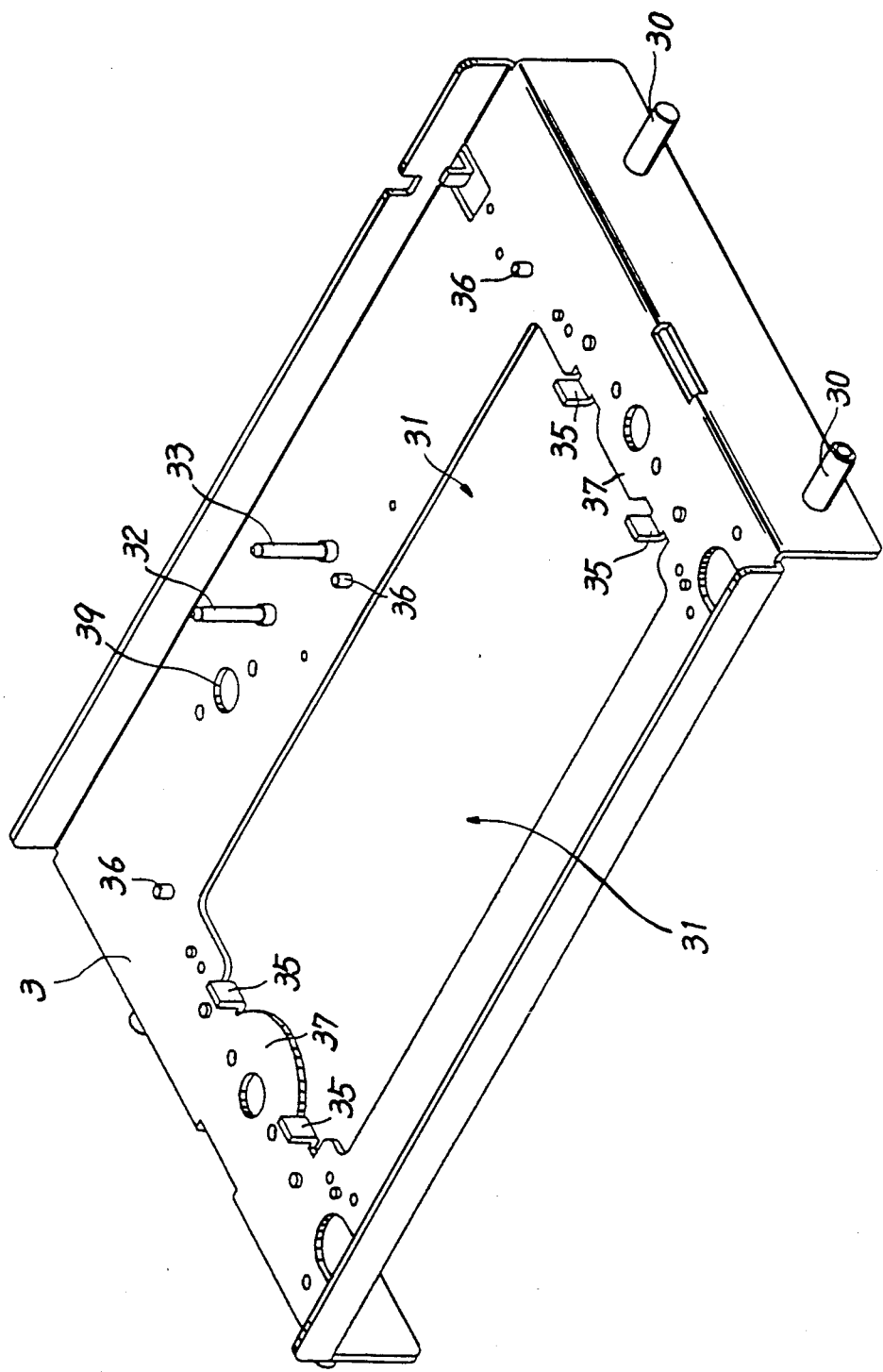
FIG. 17 is a perspective view of the movable chassis.

As shown in FIG. 17, three pins 36, 36, 36 projecting upward from the movable chassis 3 are arranged at a given spacing along a straight line extending in the direction of movement of the pickup 5 along the opening 31. The rack assembly 8 fabricated as stated above has its guide grooved portion 81c engaged with the pins 36 with slight play and is thereby slidably mounted on the movable chassis 3. Except when the rack assembly 8 is positioned centrally of the range of its movement, the assembly 8 is guided for movement by two of the three pins 36.

As seen in FIG. 17, the movable chassis 3 has around the opening 31 mount portions 37, 37 for the spindle motors 41, 41, a mount portion 39 for the feed motor 52, and shafts 32, 33 for the driven gears 57, 58.

Figure 21:
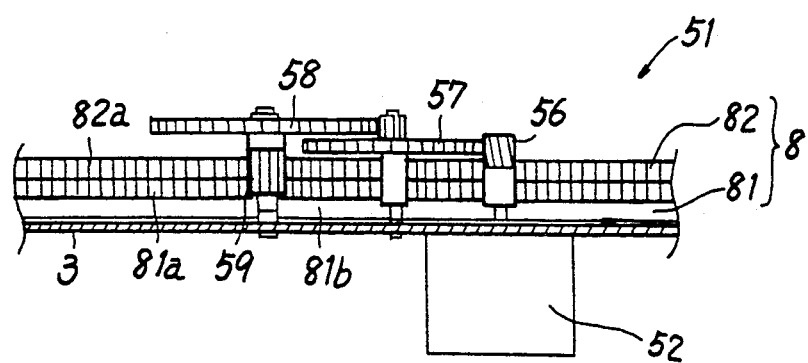
FIG. 21 is a fragmentary side elevation showing a pickup transport mechanism.

With the rack assembly 8 mounted on the movable chassis 3, the gear portions 81a, 82a of the two racks 81, 82 mesh with the pinion 59 at the same time as shown in FIG. 21. At this time, the two racks 81, 82 are biased by the spring 154 away from each other, so that when one tooth of the pinion 59 is in engagement with two teeth of the racks 81, 82 which teeth are positioned at opposite sides of the one tooth, the pinion tooth is clamped between the two teeth. This eliminates the backlash between the rack assembly 8 and the pinion 59. Consequently, the pinion is changeable in the direction of its rotation without producing play in the movement of the rack assembly 8.

The rack assembly 8 is prevented from slipping off the movable chassis 3 upward by the contact of the ridge 81b of the first rack 81 with the end of the pinion 59 shown in FIG. 15.

The pickup 5 is coupled to the rack assembly 8 by the following arrangement.

Figure 20:
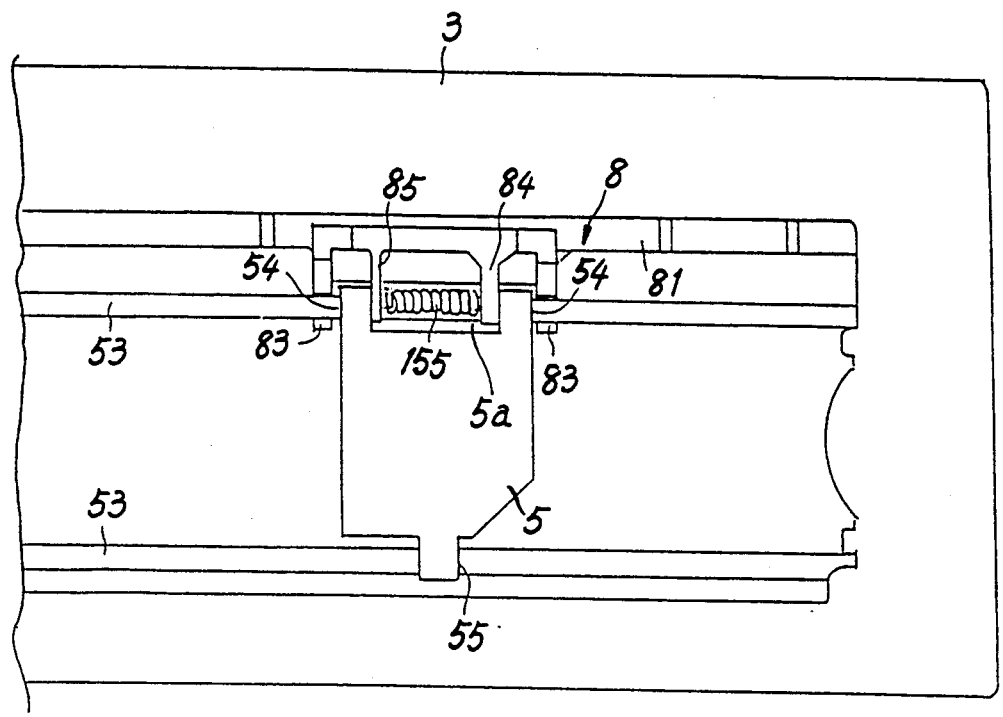
FIG. 20 is a rear view showing a rack assembly and a pickup in engagement with each other.

As shown in FIG. 20, the pickup 5 is formed with a recessed portion 5a in its rear side. The projections 84, 85 of the first rack 81 are fitted in the recessed portion 5a in intimate contact with the opposed faces thereof, and a second spring 155 is provided as compressed between these projections 84, 85. As a result, the two projections 84, 85 are biased away from each other by the second spring 155 into pressing contact with the pickup recessed portion 5a. Furthermore, the pickup 5 is held between the pair of holders 83, 83 of the first rack 81.

When the feed motor 52 operates to move the rack assembly 8 along the pins 36, 36, 36, the pickup 5 moves along the guide shafts 53, 53 with this movement. If the parallelism between the direction of movement of the rack assembly and the guide shaft 53 is low owing to variations in the degree of precision with which the pickup transport mechanism 51 is assembled, the distance between the pickup 5 and the rack assembly 8 varies with the transport of the pickup 5. Nevertheless, the pickup 5 is restrained only with respect to the direction of movement of the rack assembly by the holders 83, 83 and the projections 84, 85 of the assembly 8 as already described but is movable relative to the assembly 8 in a direction perpendicular to the direction of assembly movement. The relative movement therefore absorbs the variation in the distance.

Accordingly, the rack assembly 8 can be driven smoothly by the operation of the pinion 59 and exerts no objectionable force on the pickup 5, permitting the pickup to move straight along the guide shafts 53 accurately.

Control of Transport of Pickup

As is well known, the compact disc has recorded on the innermost peripheral portion of its signal bearing surface "table of contents" (hereinafter referred to as "TOC") which is the data as to the titles of pieces of music recorded in the program area of the signal bearing surface. For signal reproduction, the TOP of the disc intended for playback must be read out first and stored.

With disc players such as the one described above which are adapted for the playback of two discs in succession, there is a need to read TOC from the two discs with a signle pickup, so that a series of operations from reading of TOC through the reproduction of signals from the program area must be conducted as promptly as possible. For this purpose, the operation of the pickup should not involve any idle movement.

According, the following signal reproduction system is employed for the present disc player.

Figure 22:
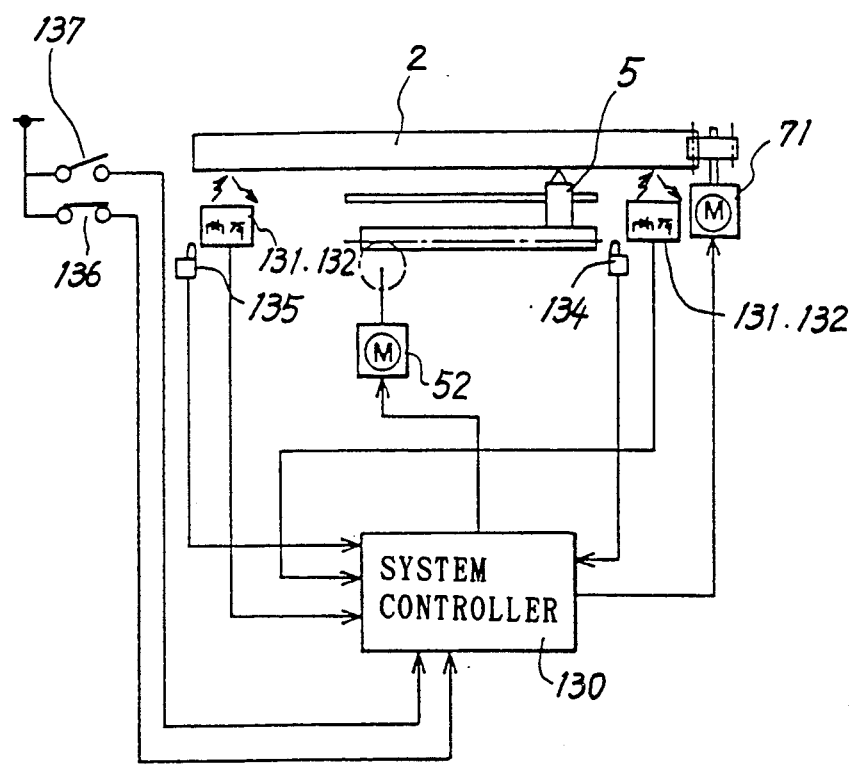
FIG. 22 is a diagram showing a control system including a system controller.

FIG. 22 shows a circuit for controlling the operation of the tray 2 and the pickup 5. The control system includes a system controller 130 comprising a microcomputer and adapted to control the starting, stopping and direction of rotation of the loading motor 71 and the feed motor 52.

The front panel of the cabinet has an open switch 136 and a close switch 137 for giving a command to open or close the tray. The command signals from these switches are fed to the system controller 130. Accordingly, the controller 130 produces a control signal for starting the loading motor 71 in the disc unloading direction when the open switch 136 is actuated, or a control signal for starting the motor 71 in the disc loading direction when the close switch 137 is actuated.

The time when the pickup 5 has reached a first end position of its movement where it is opposed to the innermost peripheral portion of one of the discs, and the time when the pickup has reached a second end position of its movement as opposed to the innermost peripheral portion of the other disc are detected respectively by a first limit switch 134 and a second limit switch 135 which are arranged at opposite ends of the range of movement of the pickup 5 as shown in FIG. 15, in corresponding relation to the respective projecting pieces 83a, 83a of the pickup 5. The detection signals from these switches are fed to the system controller 130.

The time when the tray has reached the limit position of its movement toward the disc discharge side is detected by a third limit switch 138 mounted on the fixed chassis 12 in opposed relation with the end of the tray 2 as shown in FIG. 5.

The presence or absence of the disc on the tray 2 upon the completion of charging of the tray 2 is detected by photocouplers comprising a pair of laser diodes 132, 132 attached to the support arm 61 of of the disc clamp mechanism 6 as shown in FIG. 14, and a pair of photosensors 131, 131 provided on the movable chassis 3 and opposed to the respective laser diodes 132 as seen in FIG. 5.

When the tray 2 has been completely placed in, each laser diode 132 is turned on, and whether or not the photosensor 131 receives the laser beam is detected. With the disc 10 set on the turntable 4 as seen in FIG. 2C, the beam of the laser diode 132 is blocked by the disc 10 without impinging on the photosensor 131, whereas if the disc 10 is absent, the beam from the diode 132 passes through the hole 27 in the tray 2 and reaches the photosensor 131 and is detected. The detection signal from the photosensor 131 is fed to the system controller 130 shown in FIG. 22.

The arrival of the movable chassis 3 at its raised position, i.e., the completion of disc loading operation, is detected by a fourth limit switch 139 which is disposed on the fixed chassis 12, as opposed to the end of the drive member 91 as shown in FIG. 5.

The feature of the signal reproduction system for the disc player of the present invention is that in response to a command signal from the open switch 136 or the close switch 137, the system controller 130 feeds a control signal to the feed motor 52 to move the pickup 5 toward the disc accommodating portion marked with the identification symbol "B" and position the pickup 5 at the innermost peripheral portion of the disc (hereinafter referred to as the "disc B") in the accommodating portion for the pickup to read TOC from the disc B first. The pickup 5 is then transported to the innermost peripheral portion of the disc (disc A) in the accommodating portion marked with the identification symbol "A" for the pickup to read TOC from the disc A and is thereafter allowed to wait at this position for the reproduction of signals.

Thus, the pickup 5 is eventually positioned at the innermost peripheral portion of the disc A for the following reason. Generally, the user determines in his mind a preferential order of playback according to the order of identification symbols, and it is thought that the disc A is to be followed by the disc B when signals are to be reproduced. It is therefore likely that the disc intended for playback first will be set in the disc accommodating portion marked with "A" which is earlier in the order of identification symbols.

The operation of the control circuit will be described in greater detail with reference to the flow charts of FIGS. 23 to 25.

Figure 23:
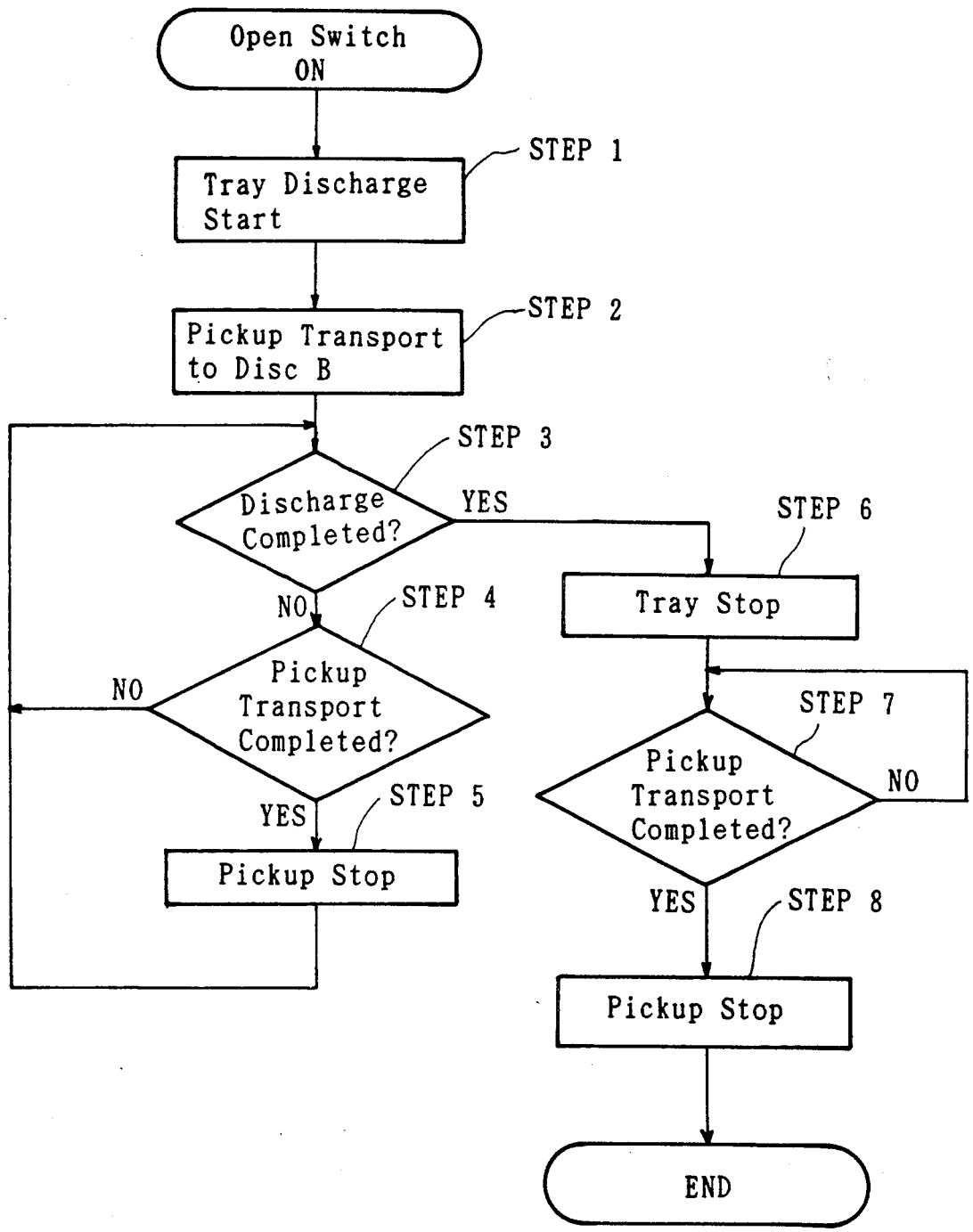
FIGS. 23 to 25 are flow charts for illustrating a process for controlling transport of the pickup.

FIG. 23 is a flow chart showing a tray discharge operation. When the open switch 136 is manipulated with the tray placed in, the loading motor 71 is started in response to the command, starting to discharge the tray 2 (step 1). Simultaneously with this, the feed motor 52 is started to transport the pickup 5 toward the position of the innermost periphery of the disc B (step 2).

Next, a signal from the third limit switch 138 indicates completion of discharge of the tray 2 (step 3). If the inquiry of this step is answered in the negative, step 4 inquires whether the pickup 5 has reached the position of the innermost periphery of the disc B with reference to a signal from the first limit switch 134. When the answer is affirmative, the pickup 5 is stopped (step 5), whereupon the sequence returns to step 3.

According to steps 3 to 5, if the pickup has reached the end position of its movement prior to the completion of tray discharge, the pickup is immediately stopped. For example, if the open switch is manipulated when the pickup is at the outermost peripheral position of the disc A, the pickup is close to the portion where the disc B is accommodated, and the distance the pickup is to be moved is small, so that the transport of the pickup is completed earlier than the completion of tray discharge. In this case, the answer to the inquirey of step 4 is affirmative, followed by step 5 to discontinue the transport of the pickup.

When the answer to step 3 is affirmative, step 6 follows to discontinue the discharge of the tray. Step 7 inquires whether the pickup has been completely transported. If the answer is negative, pickup transport is continued, but if it is affirmative, pickup transport is discontinued (step 8) to complete the tray discharge operation.

The above process executed brings the pickup to the innermost peripheral position of the disc B.

Figure 24:
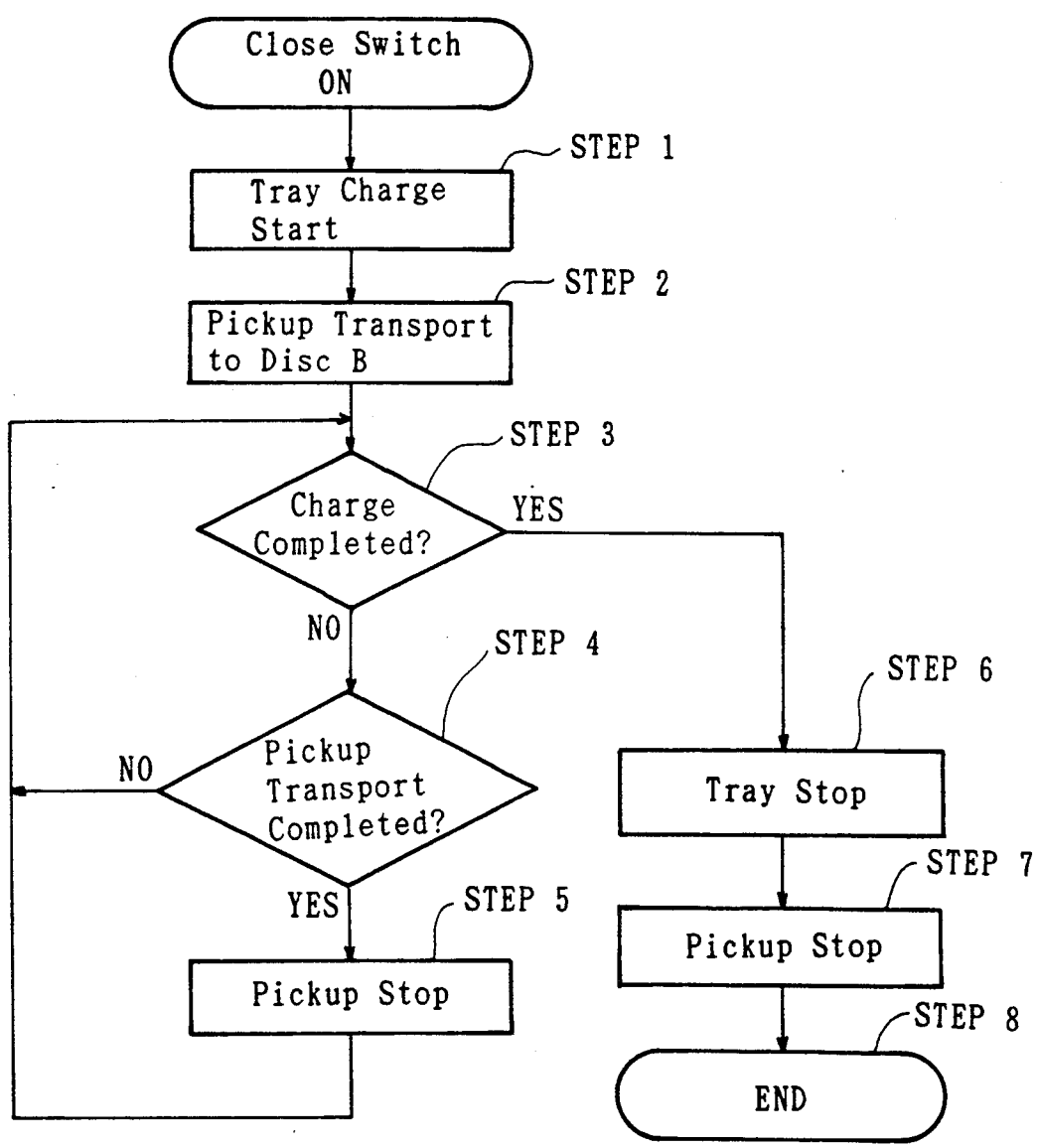

FIG. 24 is a flow chart showing a tray forwarding or charging operation. If the operation of FIG. 23 has been entirely completed when the tray charging operation is to be initiated, the pickup is already at the innermost peripheral position of the disc B, so that it is no longer necessary to transpor the pickup. However, in the case where a tray charge command is given as an interrupt command while the pickup is still in continued movement after the tray has been discharged (for example when step 7 in FIG. 23 is answered in the negative), a tray charge operation is initiated during the transport of the pickup. In this case, transport of the pickup needs to be continued. The process of FIG. 24 is therefore executed.

Upon the manipulation of the close switch 29, an operation to charge the tray 2 is started (step 1). At the same time, the pickup 5 is transported toward the innermost peripheral position of the disc B (step 2).

Step 3 then inquires whether the tray 2 has been completely charged. If the answer is negative, a further inquiry is made as to whether the pickup has been completely transported (step 4). When the inquiry is answered in the negative, the sequence returns to step 3. If otherwise, the pickup is stopped (step 5), followed by step 3.

When transport of the pickup is started in step 2 of FIG. 24 in the case where pickup transport has been completed with the tray discharge operation of FIG. 23 as already stated, step 4 is answered in the affirmative at the same time, followed by step 5 to discontinue pickup transport, with the result that the pickup remains in the initial position almost without any movement. In the case where the pickup is in movement, on the other hand, an inquiry is made in step 4 as to whether the pickup has reached the innermost peripheral position of the disc B. When the answer is negative, step 3 follows, whereas if otherwise, the pickup is stopped in step 5, whereupon the sequence returns to step 3.

When the inquiry of step 3 is answered in the affirmative because the tray has been placed in, the tray is halted (step 6). If the pickup is in travel at this time, pickup transport is forcibly discontinued (step 7), whereby the tray charge operation is completed.

The above procedure is so adapted that if the pickup is brought to the innermost peripheral position of the disc B bedore the completion of tray charge, the pickup is allowed to wait at the peripheral position, and that if the tray is completely charged during the transport of the pickup, the pickup is immediately halted.

The operation to read TOC will be described with reference to the flow chart of FIG. 25.

On completion of the tray charge operation as described above, the procedure of FIG. 25 is started immediately. First, step 1 inquires whether the disc B is present according to whether the photosensor receives laser beam from the laser diode. When the answer is affirmative, the pickup 5 is transported to the innermost peripheral position of the disc B (step 2), followed by step 3 to read out TOC from the disc B. The TOC is stored in a RAM within the system controller 130.

The pickup is transported in step 2 only in the case where the transport has been discontinued before the pickup reaches the end position of its movement in the tray charge operation of FIG. 24. In this case, the pickup has been brought close to the innermost peripheral position of the disc B by the tray discharge and charge operations of FIGS. 23 and 24, so that the the pickup 5 can be transported to the innermost peripheral position within a very short period of time.

In the case where the disc B is present on the tray 2, the TOC is thus read out promptly by the pickup 5.

On completion of reading of the TOC from the disc B, an inquiry is made as to whether the disc A is present with reference to a signal from the photosensor concerned (step 4). When the answer is affirmative, the pickup is transported to the innermost peripheral position of disk A (step 5) and reads TOC from the disc A (step 6). The TOC is stored in the RAM within the system controller 130.

In the case where both the disc A and the disc B are present, the pickup reads TOC first from the disc B and then from the disc A, with the result that on completion of TOC reading, the pickup is located at the innermost peripheral position of the disc A. Accordingly, when signals are to be reproduced from the disc A immediately thereafter, the pickup can be promptly initiated into the reproducing operation.

In the case where the disc A only is present and the disc B is absent, the absence of the disc B is detected in step 1, followed by step 4 to detect the presence of the disc A and by step 5 to transport the pickup toward the innermost peripheral position of disc A.

While the pickup is often located in the innermost peripheral position of the disc B when to be transported toward the disc A, it is likely that the pickup will be positioned closer to the disc A than the disc B innermost peripheral position. This occurs in the case of the foregoing tray charge operation when the tray has been charged in place before the completion of pickup transport. In such a case, the distance the pickup is to be transported is shorter than the entire distance of transport to correspondingly shorten the time required for transporting the pickup.

Figure 25:
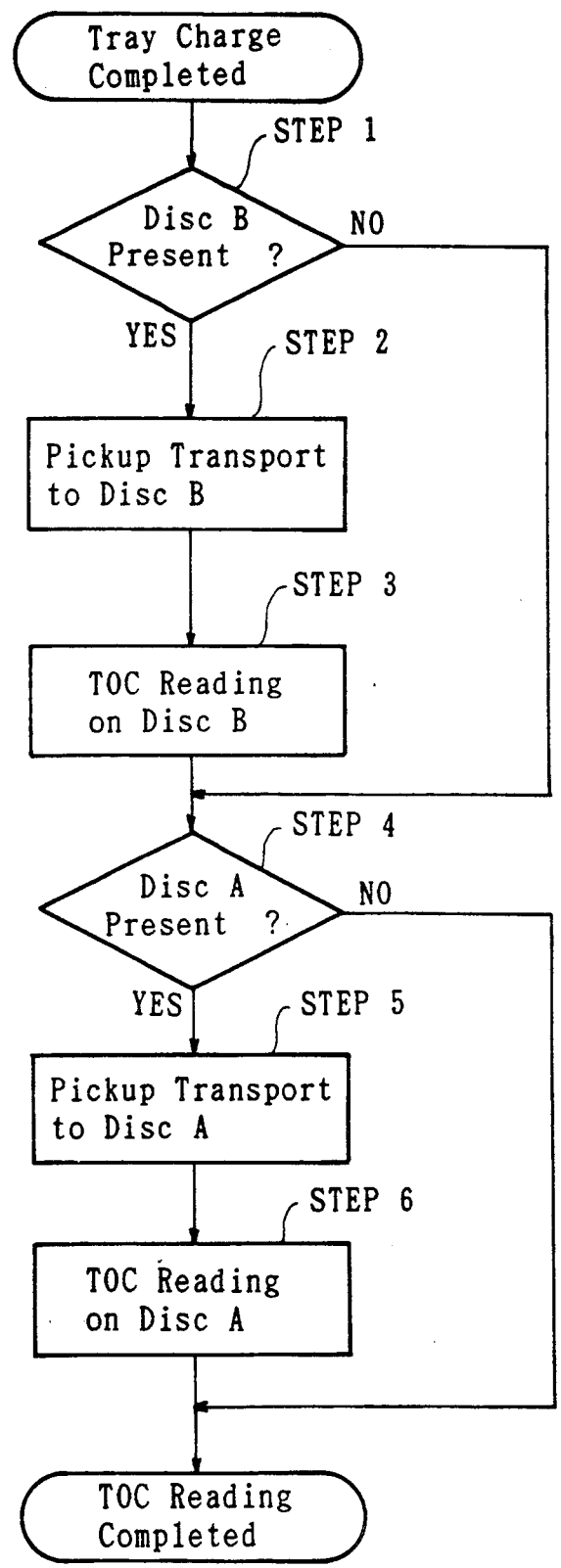
Figure 26:
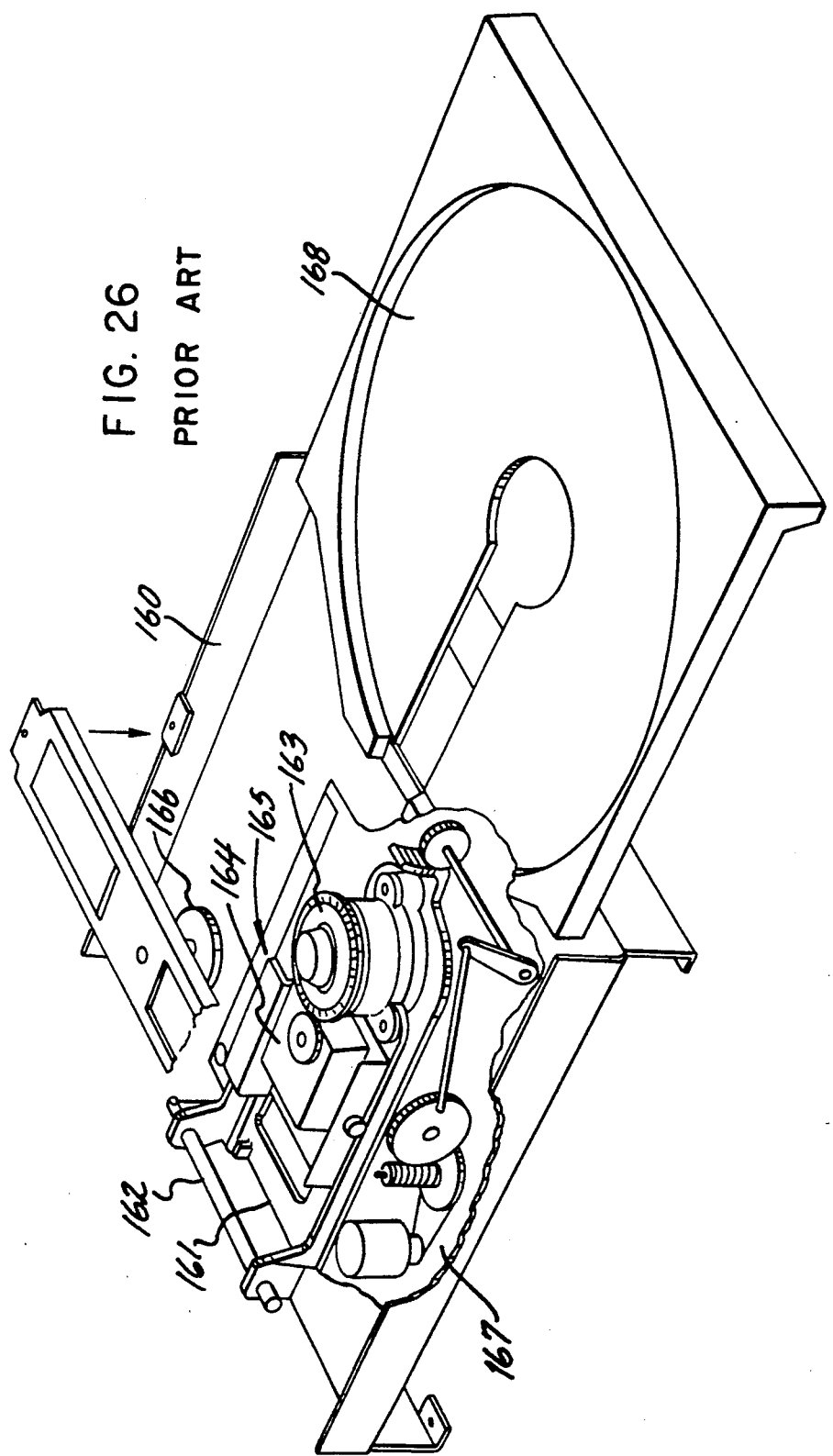
FIG. 26 is a perspective view partly broken away and showing a loading mechanism in a conventional disc player.

When the disc B only is present and the disc A is absent, TOC is read from the disc B in steps 1 to 3 of FIG. 25, and the absence of the disc A is detected in step 4, whereby the TOC reading operation is completed.

When no disc is present on the tray, the inquires of steps 1 and 4 are both answered in the negative, whereby the TOC reading operation is completed.

When the procedures of FIGS. 23 to 25 are resorted to for the discharge and charge of the tray, the pickup is first set in the innermost peripheral position of the disc B or in the vicinity of this position, so that the TOC on the disc B can be immediately read out, followed by the reading of the TOC on the disc A, whereupon the pickup can be initiated into a playback operation for the disc A promptly.

The construction of the disc player of the present invention is not limited to that of the foregoing embodiment but can be modified variously by one skilled in the art without departing from the scope of the invention as defined in the appended claims.

What is claimed is:

1. A disc player including a fixed chassis provided with a disc transport tray reciprocatingly movably along a path, and a movable chassis liftably supported by the fixed chassis, the movable chassis being provided with a disc rotating turntable and a signal reproduction pickup reciprocatingly movable along a radial line of a disc on the turntable, so that with the rise of the movable chassis, a disc on the tray as positioned at the disc loading end of the path is lifted by the turntable and pressed against the turntable by a disc clamp mechanism, the disc player being characterized in that the player comprises:

a drive gear mounted on the fixed chassis and drivingly rotatable by a loading motor, a tray drive mechanism having a rack meshable with the drive gear for reciprocatingly driving the tray in a first power transmitting state in which the drive gear is in mesh with the rack, a chassis drive mechanism having a rack portion meshable with the drive gear for upwardly or downwardly driving the movable chassis in a second power transmitting state in which the drive gear is in mesh with the rack portion, and an intermediate gear mechanism operable to move the rack portion of the chassis drive mechanism toward the drive gear with the operation of the tray drive mechanism in the course of a change from the first power transmitting state to the second power transmitting state, the intermediate gear mechanism being operable to move the rack of the tray drive mechanism toward the drive gear with the operation of the chassis drive mechanism in the course of a change from the second power transmitting state to the first power transmitting state.

2. A disc player as defined in claim 1 wherein the intermediate gear mechanism holds the movable chassis in a lowered position in the first power transmitting state and holds the tray in the disc loading end of the path in the second power transmitting state.

3. A disc player as defined in claim 1 wherein the rack of the tray drive mechanism is integral with the tray, and the chassis drive mechanism comprises a drive member provided on the fixed chassis and slidable in the same direction as the direction of movement of the tray, and cam means interposed between the drive member and the movable chassis, the rack portion being integral with the drive member, the cam means being operable with the movement of the drive member to drive the movable chassis upward or downward.

4. A disc player as defined in claim 3 wherein the cam means drives the movable chassis upward by the movement of the drive member toward a tray withdrawal direction, the rack on the tray and the rack portion on the drive member being opposed to each other with the drive gear positioned therebetween, and the drive gear, when moving the tray toward the disc loading side, rotates in the same direction as when lifting the movable chassis.

5. A disc player as defined in claim 1 wherein the tray is formed with a plurality of disc support portions as arranged along a direction perpendicular to the direction of movement of the tray, and the drive gear and the tray drive mechanism are provided at each side of the tray, the two drive gears being connected to each other by a shaft.

6. A disc player having a pickup transport mechanism for reciprocatingly transporting a pickup along a radial line of a disc on a turntable, the disc player being characterized in that the pickup transport mechanism comprises:
   guide means fixedly mounted on a chassis for guiding the pickup for the pickup to move straight along the radial line,
   rack means provided on the chassis with the pitch line of its teeth positioned in parallel to the direction of movement of the pickup and guided to move reciprocatingly in parallel to the direction of pickup movement,
   a pinion meshing with the toothed portion of the rack means at all times and drivingly rotatable by a feed motor, and
   connecting means for interconnecting the rack means and the pickup so that the rack means and the pickup are not movable relative to each other along the direction of pickup movement but are movable relative to each other in a direction perpendicular to the direction of pickup movement.

7. A disc player as defined in claim 6 wherein a pair of turntables are provided on the chassis, and the guide means for the pickup and the rack means extend alongside both the turntables, the pickup being operable for the playback of two discs on the respective turntables in succession.

8. A disc player including a pair of disc rotating turntables, a pickup reciprocatingly movable on a straight line through the centers of rotation of the turntables, and a disc clamp mechanism for pressing a disc on each of the turntables against the turntable, the disc player being characterized in that a tray is movable through a front panel inwardly or outwardly thereof and is formed on its upper side with a pair of recessed disc support portions arranged in a direction perpendicular to the direction of movement of the tray such that the disc support portions do not overlap each other, the tray being formed with a cutout across both the disc support portions for the pair of turntables and the pickup to advance thereinto, so that when the tray is set in the disc loading end of the path of its movement, two discs on the tray are positioned above the respective turntables, wherein a movable chassis is liftably supported on a fixed chassis, the tray being reciprocatingly movably mounted on the fixed chassis, the pair of turntables and the pickup being mounted on the movable chassis, the pickup being reciprocatingly transportable between two discs as positioned on the respective turntables, so that with the rise of the movable chassis, the disc on the tray as positioned at the disc loading end of the path is lifted by the turntable and held in pressing contact with the turntable by the disc clamp mechanism.

9. A disc player as defined in claim 8 wherein the tray has a pair of cavities formed in overlapping relation with the respective disc support portions and each positioned on a straight line extending from the center of the disc support portion at an angle of about 45 degrees with the direction of movement of the tray outwardly thereof, and the cavity is usable for the user to engage the finger with the outer periphery of the disc on the tray.

10. A disc player including two disc rotating turntables, a single pickup reciprocatingly movable on a radial line of a disc on each turntable, a disc loading mechanism for placing two discs on the respective turntables rotatably therewith, a disc detecting means for detecting a presence and absence of the disc on each turntable, and control means for controlling the transport of the pickup, the disc player including support means for loading the discs into the player, said support means having two disc positions for supporting the discs, each of said disc positions being labelled with identification symbols which are consecutive with respect to each other, the control means operating, after completion of disc loading, to move the pickup toward a signal reproduction position of a first disc, disposed on a first of said disc positions and to transport the pickup from the first disc toward a second disc disposed on a second disc position, said second disc position being labeled with an identification symbol which is earlier in consecutive order than said first disc position, wherein the pickup reads out contents data from the discs and the control means stores the data, and wherein the pickup being adapted, after reading the contents data from a contents data recorded position, to wait for the reproduction of signals at a contents data recorded position of the second disc, and wherein the control means cancels the reading of contents data when the absence of a disc is detected, and the pickup reproduces signals at a contents data recorded position of another disc.

11. A disc player as defined in claim 10 wherein the disc loading mechanism comprises a disc transport tray and a tray drive mechanism for reciprocatingly driving the tray, the tray being formed with a pair of disc support portions on its upper side, the tray being marked on a front face thereof with identification symbols in corresponding relation with the first and second disc positions.

12. A disc player including two disc rotating turntables, a single pickup reciprocatingly movable on a radial line of a disc on each turntable, a disc loading mechanism for placing two discs on the respective turntables rotatably therewith, a disc detecting means for detecting a presence and absence of the disc on each turntable, and control means for controlling the transport of the pickup, the disc player including support means for loading the discs into the player, said support means having two disc positions for supporting the discs, each of said disc positions being labelled with identification symbols which are consecutive with respect to each other, the control means operating, after completion of disc loading, to move the pickup toward a signal reproduction position of a first disc, disposed on a first of said disc positions and to transport the pickup from the first disc toward a second disc disposed on a second disc position, said second disc position being labeled with an identification symbol which is earlier in consecutive order than said first disc position, wherein the pickup reads out contents data from the discs and the control means stores the data, and wherein the pickup reproduces signals from an adjoining position to the contents data recorded position immediately after reading the contents data in the contents data recorded position of the second disc, and wherein the control means cancels the reading of contents data when the absence of a disc is detected, and the pickup reproduces signals at a contents data recorded position of another disc.

* * * * *